US007567916B1

(12) United States Patent  
Koeppel et al.

(10) Patent No.: US 7,567,916 B1  
(45) Date of Patent: Jul. 28, 2009

(54) SYSTEM AND METHOD FOR PERFORMING WEB BASED IN-VIEW MONITORING

(75) Inventors: Arthur Koeppel, Richmond, VA (US); Jonathan Turner, Richmond, VA (US)

(73) Assignee: Capital One Financial Corporation, Glen Allen, VA (US)

( * ) Notice: Subject to any disclaimer, the term of this patent is extended or adjusted under 35 U.S.C. 154(b) by 2188 days.

(21) Appl. No.: 09/660,495

(22) Filed: Sep. 12, 2000

(51) Int. Cl.  
G06F 17/50 (2006.01)

(52) U.S. Cl. .............................. 705/10; 705/7
(58) Field of Classification Search ............ 705/7, 705/10

See application file for complete search history.

(56) References Cited

U.S. PATENT DOCUMENTS

| | | |
|---|---|---|
| 4,775,935 A | 10/1988 | Yourick |
| 4,870,579 A | 9/1989 | Hey |
| 4,992,940 A | 2/1991 | Dworkin |
| 4,996,642 A | 2/1991 | Hey |
| 5,091,852 A | 2/1992 | Tsuchida et al. |
| 5,201,010 A | 4/1993 | Deaton et al. |
| 5,311,424 A | 5/1994 | Mukherjee et al. |
| 5,353,219 A | 10/1994 | Mueller et al. |
| 5,383,111 A | 1/1995 | Homma et al. |
| 5,459,306 A | 10/1995 | Stein et al. |
| 5,515,269 A | 5/1996 | Willis et al. |
| 5,583,763 A | 12/1996 | Atcheson et al. |
| 5,668,987 A | 9/1997 | Schneider |
| 5,704,017 A | 12/1997 | Heckerman et al. |
| 5,749,081 A | 5/1998 | Whiteis |
| 5,768,142 A | 6/1998 | Jacobs |
| 5,774,868 A | 6/1998 | Cragun et al. |
| 5,790,426 A | 8/1998 | Robinson |
| 5,794,209 A | 8/1998 | Agrawal et al. |

(Continued)

FOREIGN PATENT DOCUMENTS

EP 0 265 083 4/1988

(Continued)

OTHER PUBLICATIONS

Tuten et al. "Banner-advertised Web surveys" Winter1999/Spring 2000, vol. 11, iss. 4, p. 16, 6pgs.*

(Continued)

*Primary Examiner*—Robert W Morgan  
(74) *Attorney, Agent, or Firm*—Finnegan, Henderson, Farabow, Garrett & Dunner, LLP

(57) ABSTRACT

Methods and apparatuses for performing dynamic Web-based market analysis are disclosed. A Web server presents a Web page including content to a user, via a browser located at the user's computer or workstation. The content in the Web page may be provided by third party entities that pay predetermined fees to have the Web server render their content in a Web page. While the user views the site, detailed user activities associated with the content, including in-view activities associated with viewable content in the Web page, are collected in a client side data store. After a trigger event occurs, such as the client side data store fills up, the collected data is sent back to the Web server where its is stored in a server side data store. An analytical program executed by the Web server retrieves the collected response data from the data store and performs market analysis on the collected response data. The analytical program produces results associated with the effectiveness of the content included the Web page. A middleware program, executing in the Web server, retrieves the result data and produces billing records, that may also include content effectiveness reports, and sends the billing records to respective third party entities that supplied the content for billing and marketing purposes.

69 Claims, 20 Drawing Sheets

U.S. PATENT DOCUMENTS

| | | | |
|---|---|---|---|
| 5,825,651 A | 10/1998 | Gupta et al. | |
| 5,835,087 A | 11/1998 | Herz et al. | |
| 5,842,199 A | 11/1998 | Miller et al. | |
| 5,867,799 A | 2/1999 | Lang et al. | |
| 5,872,850 A | 2/1999 | Klein et al. | |
| 5,878,384 A | 3/1999 | Johnson et al. | |
| 5,884,282 A | 3/1999 | Robinson | |
| 5,893,909 A | 4/1999 | Nomura et al. | |
| 5,918,014 A | 6/1999 | Robinson | |
| 5,933,811 A | 8/1999 | Angles et al. | |
| 5,948,061 A | 9/1999 | Merriman et al. | 709/219 |
| 5,949,419 A | 9/1999 | Domine et al. | 345/794 |
| 5,974,396 A | 10/1999 | Anderson et al. | |
| 6,006,218 A | 12/1999 | Breese et al. | |
| 6,006,225 A | 12/1999 | Bowman et al. | |
| 6,016,475 A | 1/2000 | Miller et al. | |
| 6,018,738 A | 1/2000 | Breese et al. | |
| 6,018,748 A | 1/2000 | Smith | 715/501.1 |
| 6,038,598 A | 3/2000 | Danneels | 709/219 |
| 6,041,311 A | 3/2000 | Chislenko et al. | |
| 6,049,777 A | 4/2000 | Sheena et al. | |
| 6,064,980 A | 5/2000 | Jacobi et al. | |
| 6,085,229 A | 7/2000 | Newman et al. | 709/203 |
| 6,092,049 A | 7/2000 | Chislenko et al. | |
| 6,108,493 A | 8/2000 | Miller et al. | |
| 6,112,186 A | 8/2000 | Bergh et al. | |
| 6,119,101 A | 9/2000 | Peckover | |
| 6,226,656 B1 | 5/2001 | Zawadzki et al. | 715/506 |
| 6,266,649 B1 | 7/2001 | Linden et al. | |
| 6,285,987 B1 * | 9/2001 | Roth et al. | 705/27 |
| 6,286,043 B1 | 9/2001 | Cuomo et al. | 709/223 |
| 6,317,722 B1 | 11/2001 | Jacobi et al. | |
| 6,317,782 B1 * | 11/2001 | Himmel et al. | 709/218 |
| 6,321,179 B1 | 11/2001 | Glance et al. | |
| 6,321,221 B1 | 11/2001 | Bieganski | |
| 6,334,127 B1 | 12/2001 | Bieganski et al. | |
| 6,356,889 B1 | 3/2002 | Lohman et al. | |
| 6,401,075 B1 * | 6/2002 | Mason et al. | 705/14 |
| 6,412,012 B1 | 6/2002 | Bieganski et al. | |
| 6,415,368 B1 | 7/2002 | Glance et al. | |
| 6,438,579 B1 | 8/2002 | Hosken | |
| 6,442,529 B1 * | 8/2002 | Krishan et al. | 705/14 |
| 6,460,036 B1 | 10/2002 | Herz | |
| 6,643,696 B2 * | 11/2003 | Davis et al. | 709/224 |
| 2002/0010757 A1 | 1/2002 | Granik et al. | 709/218 |
| 2002/0019774 A1 | 2/2002 | Kanter | 705/14 |
| 2002/0032608 A1 | 3/2002 | Kanter | 705/14 |

FOREIGN PATENT DOCUMENTS

| | | |
|---|---|---|
| EP | 0 643 359 | 3/1995 |
| EP | 0 751 471 | 1/1997 |
| EP | 0 827 063 | 3/1998 |
| GB | 2 336 925 | 11/1999 |
| JP | 1-169605 | 7/1989 |
| WO | WO 97/26729 | 7/1997 |
| WO | WO 98/02835 | 1/1998 |
| WO | WO 98/33135 | 7/1998 |
| WO | WO 99/13423 | 3/1999 |
| WO | WO 00/68851 | 11/2000 |

OTHER PUBLICATIONS

Aronson, Brad and Zeff, Robbin, "Advertising on the Internet," Online, http://library.books24x7.com, visited May 16, 2002, Copyright 1999, Chapters 3 and 6.

Matthias Jarke et al., "Query Optimization in Database Systems," Computing Surveys, vol. 16, No. 2, Jun. 1984, pp. 111-152.

Gerard Salton et al., "Term-Weighting Approaches in Automatic Text Retrieval," Information Processing & Management, vol. 24, No. 5, Jan. 1988, pp. 513-523.

John A. Swets, "Measuring the Accuracy of Diagnostic Systems," Articles, Science, vol. 240, Jun. 3, 1988, pp. 1285-1293.

Nicholas J. Belkin et al., "Information Filtering and Information Retrieval: Two Sides of the Same Coin?," Communications of the ACM, vol. 35, No. 12, Dec. 1992, pp. 29-38.

Earl Cox, "How a Machine Reasons: Part 8," AI Expert, vol. 8, No. 3, Mar. 1993, pp. 13-14.

David A. Maltz, "Distributing Information for Collaborative Filtering on Usenet Net News," Department of Electrical Engineering and Computer Science, Massachusetts Institute of Technology, May 1994, pp. 1-78.

Pattie Maes, "Agents that Reduce Work and Information Overload," Communications of the ACM, vol. 37, No. 7, Jul. 1994, pp. 31-40 and 146.

M.W. Berry et al., "Using Linear Algebra for Intelligent Information Retrieval," Department of Computer Science, University of Tennessee, Knoxville, TN, Information Science Research Group, Bellcore, Morristown, NJ, Dec. 1994, pp. 1-24.

Paul Resnick et al., "GroupLens: An Open Architecture for Collaborative Filtering of Netnews," CSCW, 1994, pp.175-186.

Upendra Shardanand et al., "Social Information Filtering: Algorithms for Automating 'Word of Mouth'," Chi '95 Conference Proceedings on Human Factors in Computing Systems, May 7-11, 1995, pp. 210-217.

Pat Langley et al., Applications of Machine Learning and Rule Induction,: Communications of the ACM, vol. 38, No. 11, Nov. 1995, pp. 54-64.

Curtis H.K. Tsang et al., "An Object Oriented Intelligent Tourist Advisor System," Proc. 1996 Australian New Zealand Conf. on Intelligent Information Systems, Adelaide, Australia, Nov. 18-20, 1996, pp. 1-4.

Net Perceptions, Inc., White Paper, "Building Customer Loyalty and High-Yield Relationships Through GroupLens™ ," http://www.netperceptions.com/whitepaper.html, (Visited Nov. 22, 1996), pp. 1-9.

Paul Resnick et al., "Recommender Systems," Communications of the ACM, vol. 40, No. 3, Mar. 1997, pp. 56-58.

Loren Terveen et al., "Phoaks: A System for Sharing Recommendations," Communications of the ACM, vol. 40, No. 3, Mar. 1997, pp. 59-62.

Henry Kautz et al., "Referral Web: Combining Social Networks and Collaborative Filtering," Communications of the ACM, vol. 40, No. 3, Mar. 1997, pp. 63-65.

Marko Balabanovic et al., "Fab: Content-Based, Collaborative Recommendation," Communications of the ACM, vol. 40, No. 3, Mar. 1997, pp. 66-72.

James Rucker et al., "Siteseer: Personalized Navigation for the Web," Communications of the ACM, vol. 40, No. 3, Mar. 1997, pp. 73-76.

Joseph A. Konstan et al., "GroupLens: Applying Collaborative Filtering to Usenet News," Communications of the ACM, vol. 40, No. 3, Mar. 1997, pp. 77-87.

Christopher Avery et al., "Recommender Systems for Evaluating Computer Messages," Communications of the ACM, vol. 40, No. 3, Mar. 1997, pp. 88-89.

Henry Lieberman, "Autonomous Interface Agents," Papers, Chi 97, Mar. 22-27, 1997, pp. 67-74.

Richard V. Dragan et al., "Advice from the Web," PC Magazine, vol. 16, No. 15, Sep. 1997, pp. 133-137.

Paul McJones et al., "Each to Each Programmer's Reference Manual," SRC Technical Note, Oct. 1997, pp. 1-16.

Chris Locke, "Intelligent Agents Create Dumb Users (?)," Online & CDROM Review, vol. 21, No. 6, 1997, pp. 369-372.

Bradley N. Miller et al., "Experiences with GroupLens: Making Usenet Useful Again," Usenix Association, Annual Technical Conference, 1997, pp. 219-233.

Al Borchers et al., "Ganging up on Information Overload," Computer, Apr. 1998, pp. 106-108.

Stefania Montani et al., "A Case-Based Retrieval System for Diabetic Patients Therapy," Proceedings on the Third International Conference on Neural Networks and Expert Systems in Medicine Healthcare, Pisa, Italy, Sep. 2-4, 1998, pp. 160-168.

John S. Breese et al., "Empirical Analysis of Predictive Algorithms for Collaborative Filtering," Technical Report MSR-TR-98-12, Microsoft Research, Redmond, WA, Oct. 1998, pp. 1-20.

Marc Johnson et al., "Direct E-mail: Winning Long-term Consumer Attention," Jupiter Communications, Dec. 1998, pp. 1-26.

Badrul M. Sarwar et al., "Using Filtering Agents to Improve Prediction Quality in the GroupLens Research Collaborative Filtering System," CSCW, 1998, pp. 345-354.

Chumki Basu et al., "Recommendation as Classification: Using Social and Content-Based Information in Recommendation," American Association for Artificial Intelligence, 1998, pp. 714-720.

Gary Boone, "Concept Features in Re:Agent, an Intelligent Email Agent," Autonomous Agents, 1998, pp. 141-148.

Jonathan L. Herlocker et al., "An Algorithmic Framework for Performing Collaborative Filtering," Dept. of Computer Science and Engineering, University of Minnesota, 1999, pp. 1-8.

Nathaniel Good et al., "Combining Collaborative Filtering with Personal Agents for Better Recommendations," American Association for Artificial Intelligence, 1999, pp. 1-8.

Robert O'Harrow Jr., "Private or Not?," Washington Post, http://www.washingtonpost.com/cgi-bin/gx.cgi/AppL, May 17, 2000, (Visited Jun. 13, 2000), pp. 1-4.

Susan Stellin, "Internet Companies Learn How to Personalize Service," E-Commerce Report, Aug. 2000, http://www.nytimes.com/library/tech/00/08/cyber/commerce/28commerce.html, (Visited Aug. 28, 2000), pp. 1-5.

George Karypis, "Suggest: Top-$N$ Recommendation Engine Version 1.0," University of Minnesota, Department of Computer Science/Army HPC Research Center, Minneapolis, MN, Nov. 2000, pp. 1-11.

Ming C. Hao et al., "Visualization of Directed Association in E-Commerce Transaction Data," Department of Computer Science, Swiss Federal Institute of Technology, Zurich, Switzerland, Dec. 2000, pp. 1-7.

Badrul Sarwar et al., "Item-based Collaborative Filtering Recommendation Algorithms," WWW10, May 1-5, 2001, Hong Kong, pp. 1-15.

Luis Mateus Rocha, "Adaptive Recommendation and Open-Ended Semiosis," Kybernetes, vol. 30, No. 5-6, 2001, pp. 1-28.

"Imagine: Extracting Knowledge from Large Collections," http://teefix.femuni-hagen.de/~ferber/imagine/, (Visited Jan. 3, 2002), pp. 1-2.

"Imagine: Interaction Merger for Associations Gained by Inspection of Numerous Exemplars," http://teefix.fernuni-hagen.de/~ferber/imagine/imagine-info-engl.html, (Visited Jan. 3, 2002), pp. 1-4.

George Karypis, "Evaluation of the Item-Based Top-$N$ Recommendation Algorithms," University of Minnesota—Computer Science and Engineering, Sep. 2000, https://wwws.cs.umm.edu/tech-reports/listing/list-report.cgi, (Visited Feb. 4, 2003), pp. 1-14.

J. Ben Schafer et al., "Recommender Systems in E-Commerce," Department of Computer Science and Engineering, University of Minnesota, Minneapolis, MN, pp. 1-9.

Andreas Geyer-Schulz et al., "A Customer Purchase Incidence Model Applied to Recommender Services," pp. 1-11.

Elias N. Houstis et al., "PYTHIA-II: A Knowledge/Database System for Managing Performance Data and Recommending Scientific Software," Dept. of Computer Sciences, Purdue University, West Layfayette, IN, College of Information Science & Tech., Drexel University, Philadelphia, PA, Dept. of Computer Science, Virginia Tech, Blacksburg, VA, and Dept. of Computer Science, University of Crete, Heraklion, Greece, pp. 1-24.

Kwok-Wai Cheung et al., "Mining Customer Product Ratings for Personalized Marketing," Department of Computer Science, Hong Kong Baptist University, Kowloon Tong, Hong Kong, and Department of Computer Science, Hong Kong University of Science and Technology, Clear Water Bay, Hong Kong, pp. 1-21.

Olfa Nasraoui et al., "Mining Web Access Logs Using Relational Competitive Fuzzy Clustering," pp. 1-5.

John Canny, "Collaborative Filtering with Privacy via Factor Analysis," Computer Science Division, University of California, Berkeley, CA, pp. 1-8.

David Maltz et al., "Pointing the way: active collaborative filtering," Dept. of Computer Science, Carnegie-Mellon University, Pittsburgh, PA and Lotus Development Corporation, Cambridge, MA, pp. 1-11.

Christos Faloutsos et al., "A Survey of Information Retrieval and Filtering," University of Maryland, College Park, MD, pp. 1-22.

William W. Cohen, "Fast Effective Rule Induction," AT&T Bell Laboratories, Murray Hill, NJ, pp. 1-9.

Will Hill et al., "Recommending and Evaluating Choices in a Virtual Community of Use," Bellcore, Morristown, NJ, pp. 1-12.

William W. Cohen, "Learning Rules that Classify E-Mail," AT&T Laboratories, Murray Hill, NJ, pp. 1-8.

C.E. Unterberg, Towbin, "Beyond the Banner: the birth of email marketing," pp. 1-72.

Anupam Joshi et al., "Robust Fuzzy Clustering Methods to Support Web Mining," Department of Computer Engineering and Computer Science, University of Missouri, Columbia, MO and Department of Mathematical and Computer Sciences, Colorado School of Mines, Golden, CO, pp. 1-9.

Net Perceptions: GroupLens Toolkit, http://web.archive.org/web/19970418053016/www.netperceptions.com/product.html (Visited Dec. 8, 2003), pp. 1-2.

Net Perceptions: Company Overview, http://web.archive.org/web/19970418053001/www.netperceptions.com/company.html (Visited Dec. 8, 2003), pp. 1-2.

"Home Box Office Selects Like Minds Personalization Software for Second Network Site," PR Newswire, Nov. 17, 1997.

"Net Perceptions Closes Second Round of Financing; GroupLens secures No. 1 recommendation system spot with strong endorsement by investment community," Business Wire, Mar. 2, 1998.

"Net Perceptions Debuts GroupLens Version 3.0 at Internet World Spring; 'Industrial Strength Tool Matures Into Essential Website Technology,'" Business Wire, Mar. 9, 1998.

"Fort Point Partners Teams With Like Minds to Offer Breakthrough Personalization Technology for Increased Sales Online," Business Wire, Mar. 11, 1998.

"LinkShare Launches Affiliates Profiling Software; First to Integrate Personalization Software Into Affiliates Program," PR Newswire Association Inc., Feb. 24, 2998.

"GroupLens Recommendation Engine to Standardize Internet Personalization For Singapore's Online Technologies Consortium," Business Wire, Jun. 17, 1998.

Net Perceptions, "Investor Information," http://www.corporate-ir.net/ireye/ir_sire.zhtml?ticker=NETP&script=410&layout=6&item (Visited Dec. 2, 2002), pp. 1-2.

"Net Perceptions Launches Comprehensive Hosted Marketing Services for eRetailers," http://biz.yahoo.com/bw/000712/mm_net_per.html (Visited Jul. 12, 2000), pp. 1-3.

* cited by examiner

SYSTEM AND METHOD FOR PERFORMING WEB BASED IN-VIEW MONITORING

CROSS-REFERENCE TO RELATED APPLICATIONS

This application relates to the application, Ser. No. 09/660,496, entitled "SYSTEM AND METHOD FOR PERFORMING DYNAMIC WEB MARKETING AND ADVERTISING", filed concurrently with the present application, owned by the assignee of this application and expressly incorporated herein by reference in its entirety.

BACKGROUND OF THE INVENTION

1. Field of the Invention

The present invention relates to Web based marketing and, more particularly, to a method and system for monitoring and collecting user responses to Web based content provided by Web servers.

2. Background Information

On-line advertising and content provision has grown tremendously since the inception of the Internet and on-line services. Users can access a wide variety of information associated with their interests by using the Internet and accessing Web sites generated by providers. A computer equipped with a program called a browser, such as Netscape Navigator from Netscape Corporation, makes it a simple task to traverse the vast network of information available on the Internet and, specifically, its subpart known as the "World Wide Web."

The architecture of the Web follows a conventional client-server model. The terms "client" and "server" are used to refer to a computer's general role as a requester of data (the client) or provider of data (the server). Under the Web environment, Web browsers reside in clients and specially formatted "Web documents" reside on Internet (Web) servers. Web clients and Web servers communicate using a protocol called "Hyper Text Transfer Protocol" (HTTP).

In operation, a browser opens a connection to a server and initiates a request for a document or a Web page including content. The server delivers the requested document or Web page, typically in the form coded in a standard "Hyper Text Markup Language" (HTML) format. After the document or Web page is delivered, the connection is closed and the browser displays the document or Web page to the user.

The Internet consists of a worldwide computer network that communicates using well defined protocol known as the Internet Protocol (IP). Computer systems and servers that are directly connected to the Internet each have an unique address consisting of four numbers separated by periods such as "123.456.0.3". To simplify Internet addressing, a "Domain Name System" was created that allows users to access Internet resources with a simpler alphanumeric naming system. For example, the name "capitalone.com" is the name for a computer system or Web server operated by Capital One®.

To further define the addresses of resources on the Internet, a Uniform Resource Locator system was created that uses a Uniform Resource Locator (URL) as a descriptor that specifically defines a type of Internet resource and its location. URLs have the following format: "resource-type://domain-.address/path-name." The "resource-type" defines the type of Internet resource. Web documents, for example, are identified by the resource type "http", which indicates the protocol used to access the document.

To access a document on the Web, the user enters a URL for the Web document into a browser program executing on a client system with a connection to the Internet. The Web browser then sends a request in accordance with the HTTP protocol to the Web server that has the Web document using the URL. The Web server responds to the request by transmitting the requested object to the client. In most cases, the object is a plain text document containing text (in ASCII) that is written in HTML. Such objects often contain hyperlinks to other Web documents. The Web browser displays the HTML document on the screen for the user and the hyperlinks to other Web documents are emphasized in some fashion such that the user can select the hyperlink.

In some instances, the HTML document may contain data from more than one server. For example, remote text and images may be retrieved from remote servers and integrated into a Web document by a client system. One server may provide an image file, while another server may provide text information to the client system over a network such as the Internet. Different techniques are available to display these types of composite Web documents. For example, a program called a servlet executing on one of the servers may combine data from the various servers referenced in a selected Web document and transmit the composite Web document to the client. In other configurations, the client may utilize a program called an applet, which may be transmitted to the client from one of the servers, to access the multiple servers offering parts of the composite and to build the composite Web document.

Generally, users view the content delivered in the Web pages and may select hyperlinks to other sub pages of a Web site, or to entirely different Web sites. Providers associate the users "browsing" these Web pages as potential consumers for the products and services they provide. By simply providing a Web server having information on a providers' product and service offerings and a customer database, and linking the Web server to the Web, providers may track user interactions with the Web server including visits, sales, buying trends and product/service preferences—all at the user level. Providers may then present or offer its customers with products and services they are most likely to buy—on an individual basis. For this reason alone most marketing professionals consider the Web to be one of the best direct marketing tools. In order to gain new, or retain existing, customers, providers need to ensure they present products and services that potential consumers are interested in. Accordingly, the importance of target advertising and target content provision has become an important role in the way providers conduct business over the Internet.

One conventional technique associated with target advertising is the use of advertising banners presented on existing Web pages generated by providers. When a user accesses a Web page associated with a provider, using a Web browser such as Netscape Navigator or Microsoft Internet Explorer, a banner advertising the provider's products or services appears on the Web page. This banner may be presented by the Web page's provider, or may be provided by a third party advertisement server. When an interested user selects the advertisement (by "clicking through" on the banner) the user is generally forwarded to another Web page or site associated with the advertisement. This page or site may be the third party advertiser's home page. The success of the advertisement is based upon the user's response, in this case, the user "clicking through" the advertisement or banner, to receive more information on the content advertised.

Conventional implementations of target advertising attempt to present appropriate information, or advertisements, to selected users, such that the probability of that user being interested in the advertisement increases. These implementations monitor and collect limited user response information, along with information associated with the advertisement presented to the users. The user response information generally includes user identification data such as, user ID, domain type, location, employer information and other general information associated with the user. The advertisement information generally includes the particular advertisement presented, the number of times the advertisement was presented, the advertisements selected by a user, and the Web pages on which these advertisements were presented. User profiles may be created that associate user interests based on the types of advertisements and Web pages the users view. The collected information is analyzed to associate a success value with a particular advertisement based on the user information and the advertisement data. For example, a successful advertisement may be declared if the advertisement produced a sufficient number of "click throughs" from a plurality of users.

However, in the event an advertisement is not declared successful, new advertisements or banners may be presented to selected users, based upon their profile. For example, users interested in athletics or sports, based on their profile, may be targeted with advertisements associated with athletic apparel, while users interested in music may be presented with advertisements associated with available concert tickets or audio CDs.

Advertisements are adjusted by replacing the presented advertisement with another image/text object stored in a database. That is, when a target advertisement is to be changed, a replacement advertisement image/text object is retrieved from a database and positioned in the accessed Web page the previous advertisement was located. Accordingly, entire banners are replaced each time a new advertisement is needed to target a selected user. Furthermore, when the objects stored in the database are no longer effective, these objects must be modified and updated, which may take a significant amount of time.

Conventional implementations of target content provision for Web sites are also associated with the disadvantage of time consumption. The conventional techniques adjusting Web site renderings is a time consuming process which incorporates human intervention and an extreme amount of information. To evaluate the success of content presented on Web sites, the providers of the site generally collect user response data similar to that described above. That is, user information such as cookies, and general content information is monitored and collected. A database is created of this collected information, which includes massive amounts of data. The information is later analyzed either by an analytical engine, or through user intervention, and resultant data is created expressing the likelihood of successful content for various profiles of target users. Decisions are made on the type of content that should be provided, and the content is manually adjusted. This includes changing a Web site's presentation, or the content provided by the site, for example changing a loan percentage rate or incentives on a type of product for sale. This process can take days, weeks or sometimes months, depending upon the resources available to a provider.

Associated with the conventional implementations of on-line advertising is the billing process in which Web page providers charge advertising providers for allowing advertisements to be presented on the Web page. For example, advertisement banners displayed on Web pages served by a Web server are generally provided by third party advertisement servers. The provider of the Web server displaying the banners generally bill the advertisement servers for each rendering of a Web page that includes the advertisement banner. A disadvantage to this conventional process is that advertisement servers may be billed for banners that are never seen by a user browsing a rendered Web page that includes the banner. This may occur when the banners are located in positions on a Web page that rarely get viewed by users, such as the "bottom" half of a Web page. Users may leave a Web page without ever viewing the banner provided by an advertisement server, while the Web server serving the Web page may still charge the advertisement server for a banner being displayed on a rendered Web page.

Accordingly, although conventional on-line target advertising and content provision techniques allow adjustments to be made on downloaded documents in order to target selected users, they lack the ability to monitor and collect detailed user response data associated with content that is actually visible to the users when browsing the downloaded documents. Furthermore, although conventional on-line advertising techniques enable providers to advertise their products and services on third party Web sites, they lack the ability to efficiently perform detailed billing based on whether an advertisement was actually in-view when a Web site including the advertisement is rendered.

SUMMARY OF THE INVENTION

It is therefore desirable to have a method and system for monitoring and collecting detailed user in-view response data at client sites and passing the collected user response data to a Web server for marketing and billing analysis.

Methods, systems and articles of manufacture consistent with the present invention collect detailed user activity information while the users are accessing Web sites, and automatically adjust the content presented in the Web site to target selected users. The changes to the content can be very drastic, such as the entire site being completely adjusted, or very minute, such as the replacement of font in selected areas of the site.

In accordance with an embodiment of the invention, a Web server presents a Web page including content to a plurality of users, via a browser executing at each users' client site. While the users view the page, detailed activities performed by each user, such as "click-throughs", screen scrolling, and mouse movements are collected in a client side data store using client side scripting, applets or similar means. After an event occurs, such as the client side data store fills up, a new URL is selected, the browser is closed, or a new Web page is selected, the collected activity data is sent back to the Web server where its is stored in a server side data store. A program executed by the Web server retrieves the collected response data from the data store and performs market analysis and produces results that reflect the success of the content presented on the Web page displayed to the users. These results are used by a second program executing on the Web server to update the content presented to the user, on a "real-time" and automatic basis. A third program performs a billing analysis on the results from the first program to determine whether the content was actually in-view to the users browsing the Web page that included the content. Results of the billing analysis are subsequently sent to a third party entity for processing.

Accordingly, the Web server can present targeted content to a user, or a group of users, based on rules associated with the users' profiles. The content can be dynamically adjusted, based on the rules, to present entirely different content or subtle differences, that may appeal to the users. Detailed user responses associated with the new content are monitored, and subsequent changes can be made by following the same process. Thus, the Web server performs closed loop "hands-free"

market analysis on the effectiveness of rendered Web pages and allow the pages to be automatically altered for future testing and analysis.

Furthermore, the Web server may perform detailed billing analysis associated with the content such that third party entities may be billed for provided content on a more economical basis.

BRIEF DESCRIPTION OF THE DRAWINGS

The foregoing summary and the following detailed description should not restrict the scope of the claimed invention. Both provide examples and explanations to enable others to practice the invention. The accompanying drawings, which form part of the description of the invention, show several embodiments of the invention, and together with the description, explain the principles of the invention.

Accompanying drawings.

DETAILED DESCRIPTION

Figure 1:
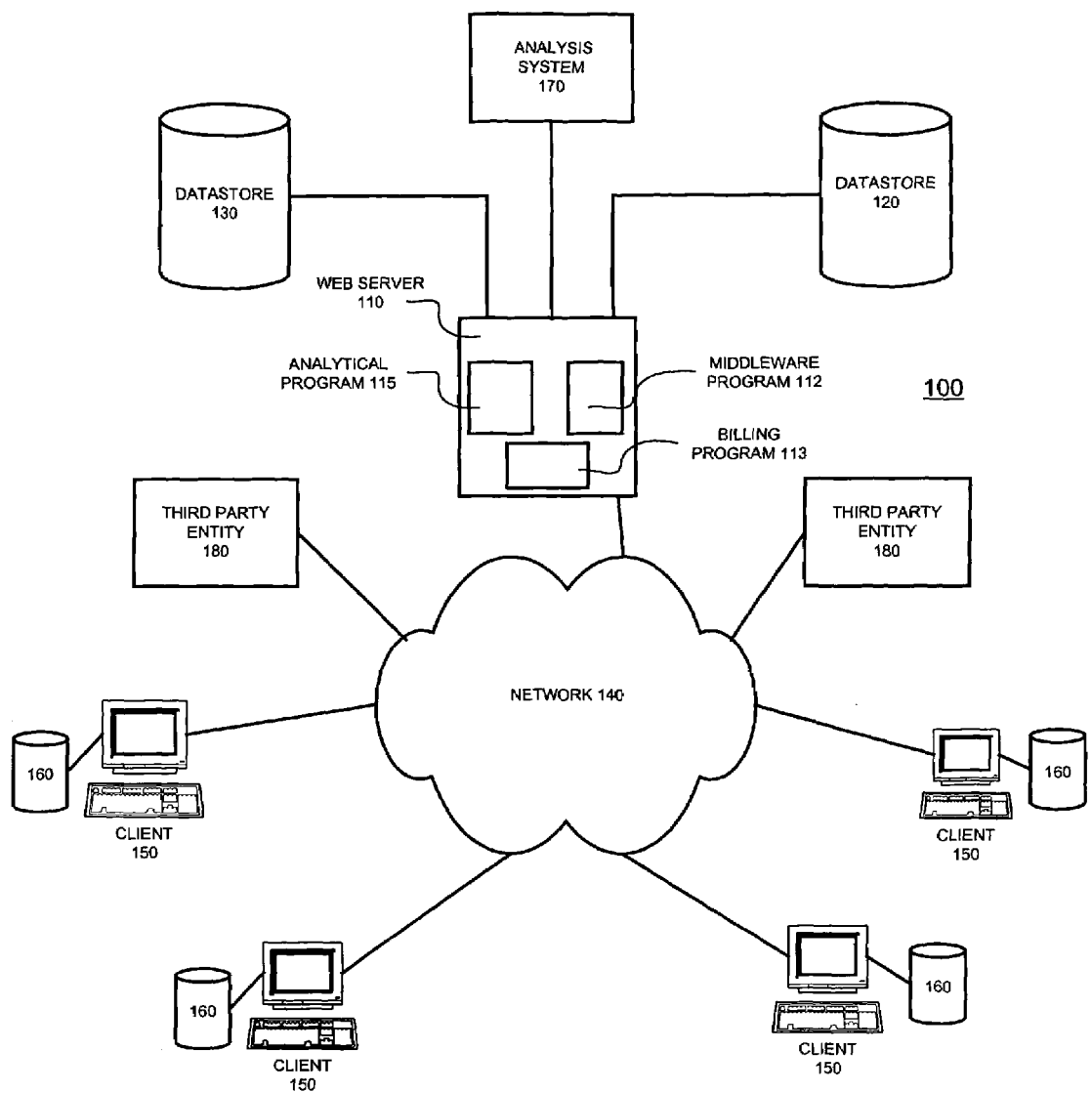
FIG. 1 is an exemplary block diagram of a Web-based network, in accordance with methods and systems consistent with the invention.

The following description of embodiments of this invention refers to the accompanying drawings. Where appropriate, the same reference numbers in different drawings refer to the same or similar elements.

In accordance with an embodiment of the invention, a network is configured such that users, located at respective client nodes equipped with browser software, request a Web page to be served to them from a Web server that resides on the Internet at a uniform resource locator. The Web server receives the requests and runs a predefined middleware program, which determines the marketing content to be placed on the requested Web page. The Web server then serves the page to the clients.

Upon receiving the Web page, each client enables the users to browse the content displayed on the page. The users' behavior in response to the displayed page is monitored at each client node, by capturing events such as mouse movements, scrolling, resizing the browser window, URL selections and/or other similar user initiated events. The captured events are sent back to the Web server in response to a detected client side trigger, and the captured event data is stored into a server side data store.

An analytical program, executing in the Web server, analyzes the collected user event data to determine the effectiveness of the content presented on the Web page. A middleware program, executing in the Web server, determines the content to serve to the client nodes based on the analysis by the analytical program. When the Web server receives a subsequent request for the Web page, the Web server serves a modified Web page that includes modified content back to the client nodes as an updated Web page. The above described process is continuously repeated allowing the present invention to perform automatic analysis on the content presented on Web pages, and dynamically adjust the content to target selected user groups, for the purposes of achieving marketing or advertising goals.

In an alternate embodiment of the invention, the detailed user monitoring and collection implementations performed by methods, systems and articles of manufacture consistent with the present invention may be applied to advertisement and content billing management. In accordance with such an alternate embodiment of the invention, a network is configured such that users, located at respective client nodes equipped with browser software, request a Web page to be served to them from a Web server that resides on the Internet at a uniform resource locator. The Web server receives the requests and runs a predefined middleware program, which determines the marketing content to be placed on the requested Web page. The marketing content may be associated with third party entities that pay fees to the provider of the Web server to have selected content included in the Web page served by the Web server. The Web server then serves the Web page to the clients.

Upon receiving the Web page, each client includes software that enable the users to browse the content displayed on the page. The users' behavior in response to the displayed page is monitored at each client node, by capturing events such as mouse movement, scrolling, resizing the browser window, URL selections or other similar detailed user initiated events. The captured events are sent back to the Web server in response to a detected client side trigger, and the captured event data is stored into a server side data store.

An analytical program, executing in the Web server, analyzes the collected user event data to generate in-view characteristic result data associated with the user responses. In response to the result data, analytical program may update rules associated with selected content. A billing program, executing in the Web server, analyzes the in-view characteristic result data produced by the analytical program. Based on the determination, the billing program then generates billing records associated with content provided by third party entities and then sends the billing records to the appropriate third party entities. In addition to performing billing operations, the billing program may generate third party content effectiveness records indicating whether any changes to the third party content is needed, based on results produced by the analytical program. Billing program may send the effectiveness records to selected third party entities enrolled in an effectiveness service provided by the Web server, or the provider of the Web server, enabling the third party entities to obtain detailed marketing information related to the effectiveness of their third party content.

FIG. 1 shows a block diagram of a network environment 100, in which the features of the invention may be implemented. As shown, network environment 100 comprises of a Web server 110, data store 120, data store 130, a network 140, analysis system 170, third party entities 180 and client nodes 150. In addition, Web server 110 comprises of middleware program 112, billing program 113 and analytical program 115.

Web server 110 may be implemented through a desktop computer, workstation or any other Web server system known in the art. Web server 110 may be equipped with Web server software such as, Microsoft Internet Information Server, Novell Web Server, Netscape Enterprise Server, or any other Web server software known in the art.

Client nodes 150 may include a desktop computer, workstation, laptop, personal digital assistant or any other similar client side system known in the art. Client nodes 150 are equipped with browser software such as Netscape Navigator, Microsoft Internet Explorer, or any other known browser software. A client-side data store 160 may also be provided for storing marketing content, content formatting information, and any other content related information, as well as user event data. Client side data store 160 may be configured as an array, flat file or any other memory configuration known in the art.

Network 140 connects Web server 110 and client nodes 150 and may include one or more communication networks, including the Internet or any other similar network that supports Web-based processing. Client nodes 150 may connect to network 140 through any suitable wired or wireless supported connection.

Third party entities 180 are entities that provide content to be rendered by Web server 110. Third party entities 180 may include interface nodes that enable network communications between the third party entity and network 140, as shown in FIG. 1. The interface nodes may include a desktop computer, workstation or any other web server system known in the art. Third party entities 180 may include interface nodes that are equipped with Web server software such as, Microsoft Internet Information Server, Novell Web Server, Netscape Enterprise Server, or any other Web server software known in the art. Third party entities 180 are associated with providers of goods or services, that desire to conduct business with Web server 110. These may include corporations, companies, individuals, or any other type of entity that can interact with Web server 110 and/or the provider of Web server 110 indirectly of network 140. That is, third party entities 180 may communicate with the provider of Web server 110 through other means than that illustrated in FIG. 1, such as telephonic communications, postal mail, electronic mail and any other known methods or means for communicating and interacting with the provider of Web server 110.

Middleware program 112 determines the content to serve to the clients 150 based on results of a in-view user response analysis performed by analytical program 115. Middleware program 112 may be constructed using JavaScript, Java Servlet, Java ServerPage, Active Server Page, Perl, C++, VB Script, XSL, SQL, or any other similar programming language.

Analytical program 115 reads and analyzes collected user response data to produce results associated with the effectiveness of the content rendered to the client nodes 150. Analytical program 115 also analyzes the user response data to determine in-view characteristics of the content rendered at the client nodes 150. Based on the results, analytical program 115 adjusts rules and content stored in data store 130, and produces an in-view results file. Analytical program 115 is programmed by analysis system 170, with analytical program rules that govern the analysis on the collected user response data. Analysis system 170 may initialize analytical program 115 prior to the first rendering of a Web page, and may periodically adjust the analytical program rules during system operation. Analytical program 115 may be constructed using JavaScript, Java Servlet, Java ServerPage, Active Server Page, Perl, C++, VB Script, XSL, SQL, or any other similar programming language. Analytical program 115 may be located in a remote location from the Web server as well.

Billing program 113 performs billing analysis based on results of a in-view user response analysis performed by analytical program 115. Billing program 113 generates billing records reflecting the billing analysis and may communicate with third party entities 180 that are connected to network 140. Billing program 113 may be constructed using JavaScript, Java Servlet, Java ServerPage, Active Server Page, Perl, C++, VB Script, XSL, SQL, or any other similar programming language.

Data store 120 connects to Web server 110, and stores user event data collected at the client nodes 150. Data store 120 may include a database or flat file data store, or may also include a flat file data store that flushes its stored data to a database for reliability and access time purposes. Furthermore, data store 120 may include a redundant database that ensure data is available in the event a primary storage element experiences a fault or error. A multitude of fault tolerant architectures may be implemented to ensure data consistency and availability.

Data store 130 connects to Web server 110, and stores content and associated rules (referred to as content rules) controlling how the content is to be rendered. As described for data store 120, a multitude of fault tolerant architectures may be implemented with data store 130 to ensure data consistency and availability. The content may include attributes associated with content renderings, such as document structure, wireless card structure, titles, headings, paragraphs, lines, lists, tables, links, graphics, objects, multimedia, scripts, forms, frames, colors, wording, size, positioning, background properties, border properties, font properties, text properties, or any combination thereof. The content may also include, but is not limited to, products and services such as wireless phones, credit cards, available financial solicitations (loans) or any other products and services that may be solicited using Web-based marketing or advertising techniques.

Content rules may include code that governs how the content is rendered on a Web page presented at the client nodes. These rules may control variations of the attributes associated with the content, such as the types of font, text, color, position, products, characteristics of associated multimedia files, various services available, or any other types of attributes associated with the content rendered. The rules may also control the frequency in which the variations of the attributes take place, such as rendering a particular font for 20% of the rendering time, or rendering a particular version of the content for 30% of the rendering time. As described above, a multitude of variations of rules and content can be processed by the Web server, and are not limited to the examples listed above.

Figure 2:
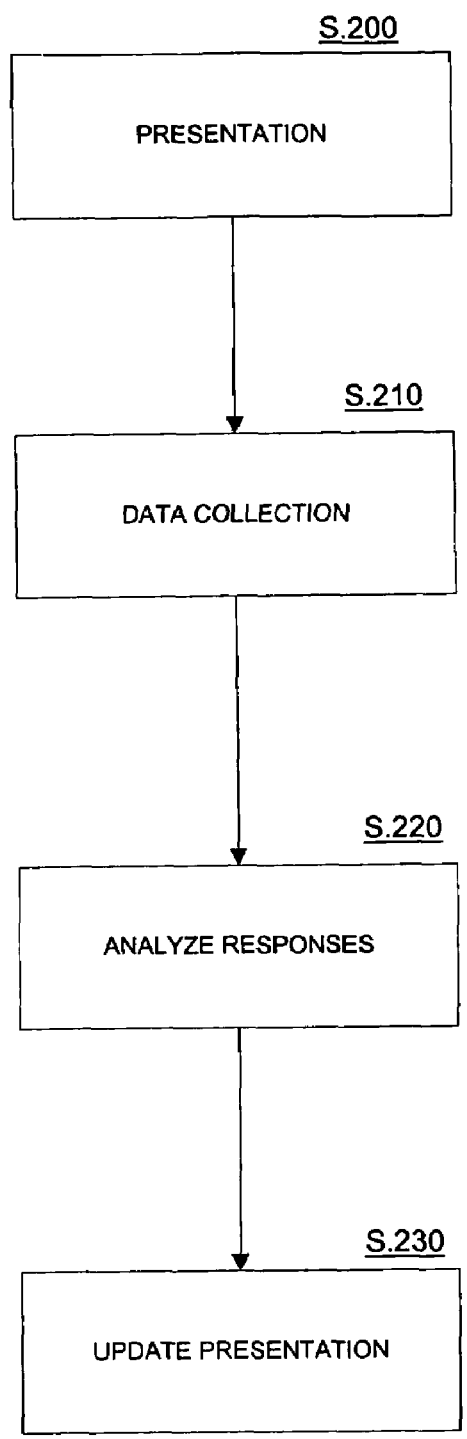
FIG. 2 is an exemplary flow chart of the steps performed by the Web-based network, in accordance with methods and systems consistent with the invention.

FIG. 2 is an exemplary flow chart of the steps performed by network 100 when performing dynamic Web-based content delivery, in accordance with methods consistent with the invention. The process begins when users located at client nodes 150 request a Web page from a Web server 110 located on network 140, using well known client side Web page accessing techniques. In response to the request, Web server 110 subsequently provides the requested page to the client nodes and browser software executing on each client node (Step S.200). A detailed description of an exemplary presentation process will be described below with reference to FIG. 3.

Each user browses the Web page, and initiates user events by performing activities such as screen scrolling, mouse movements, page resizing, link selections, or any other similar user activity associated with page browsing. The user events are monitored, collected and stored in each respective client side data store 160 (Step S.210). In response to a client side trigger detected at each client node, the stored user events are subsequently returned to the Web server 110 and stored in data store 120. A detailed description of an exemplary data collection process will be described below with reference to FIG. 5.

Analytical program 115 retrieves the stored user event data, and performs analysis (e.g. for marketing or advertising purposes) on the stored user event data in relation to the served content (Step S.220). Upon completion of the market analysis, analytical program 115 may edit the content and content rules stored in data store 130. A detailed description of an exemplary analysis process will be described below with reference to FIG. 6.

Upon detection of a subsequent request for the Web page from any client node 150, middleware program 112 applies the content rules and content updated in data store 130, adjusts the content associated with the requested Web page, and Web server 110 serves the page, with the adjusted content, back to the client nodes 150 requesting the page. Requesting client nodes 150 receive the Web page with the adjusted content and presents the page to respective users via the browser software executing at each respective client node. (Step S.230). A detailed description of an exemplary update process will be described below with reference to FIG. 3.

The process illustrated in FIG. 2 may continue in a closed loop enabling Web server 110 to perform dynamic market analysis on rendered content and perform automatic content modifications to test the effectiveness of the modified content.

Figure 3:
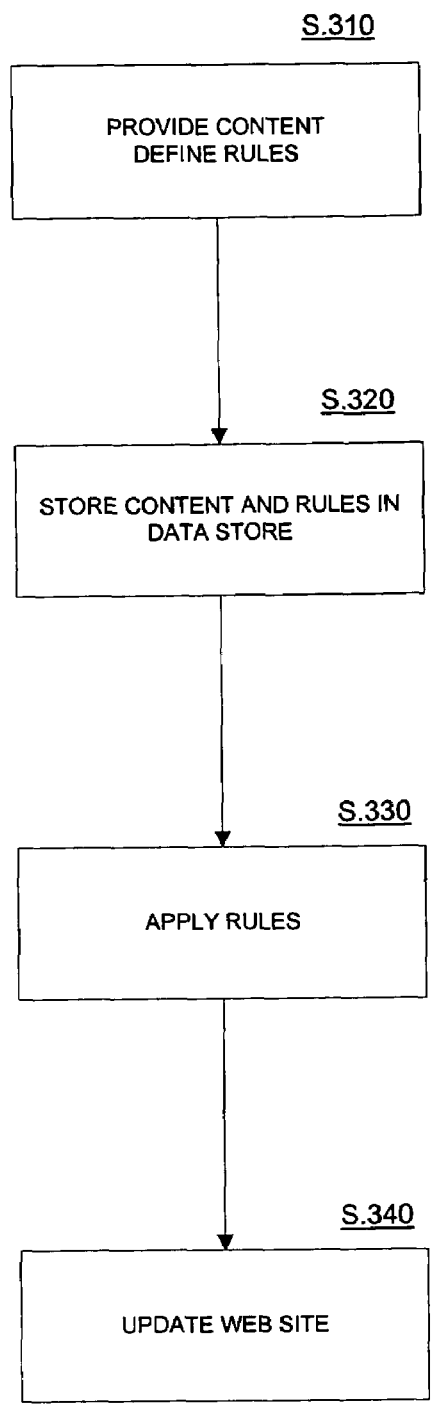
FIG. 3 is an exemplary flow chart of the steps performed by the presentation step shown in FIG. 2, in accordance with methods and systems consistent with the invention.

FIG. 3 is a flow chart of the presentation process described in FIG. 2. The process begins with the content to be rendered and the rules associated with the content being initialized (Step S.310).

The provider governing the Web server determines the types of content it wishes to market. The content may be, for example, versions of financial products, such as credit cards, offered from a financial institution. The different credit card versions may include, for example, various percentage rates, physical types of cards offered (images printed on the face of the credit card), and introductory offers associated with each card.

Figure 4A:
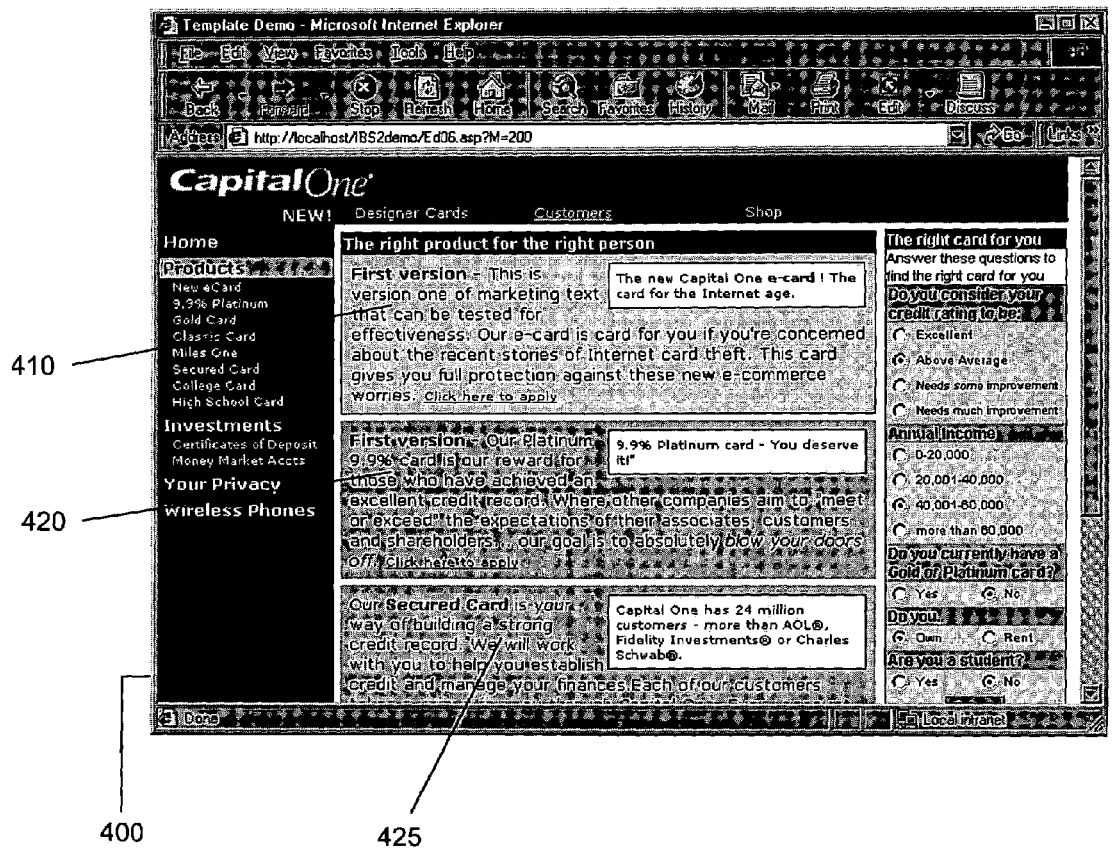
FIGS. 4A-4F are examples of various types of content that can be rendered on a Web page, in accordance with methods and systems consistent with the invention.
Figure 4B:
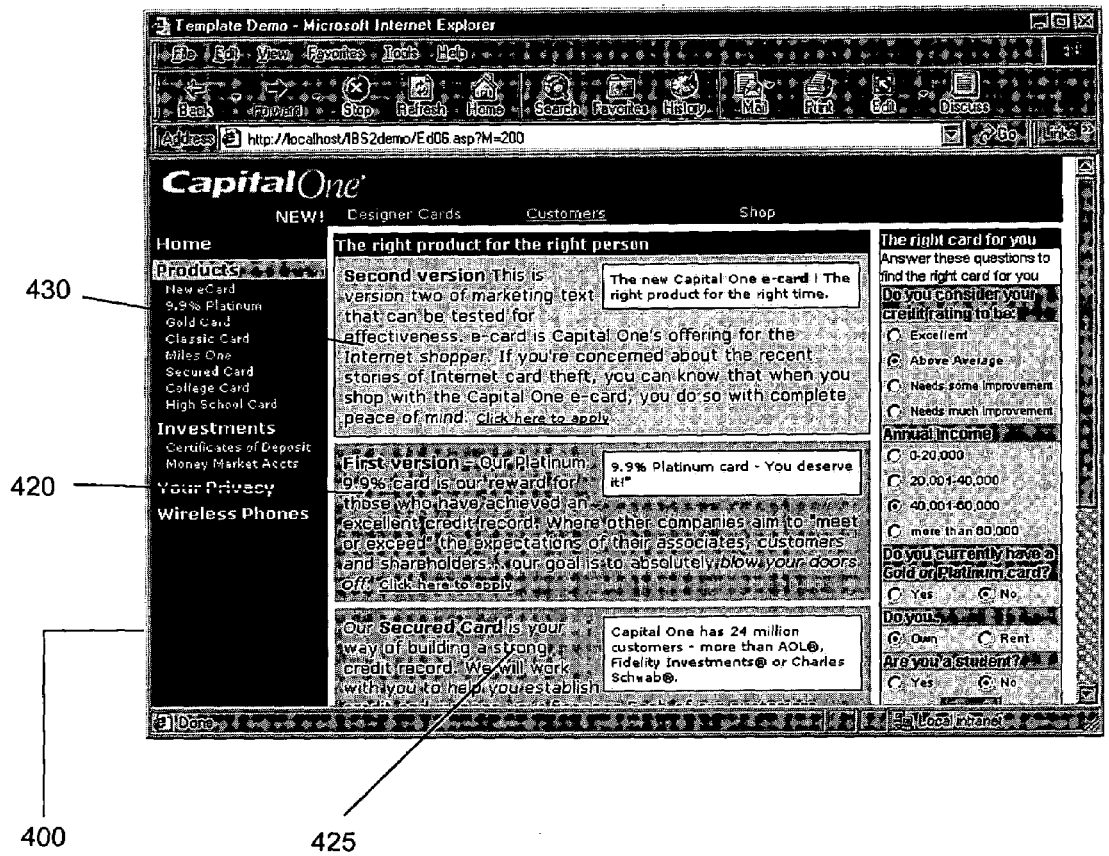
Figure 4C:
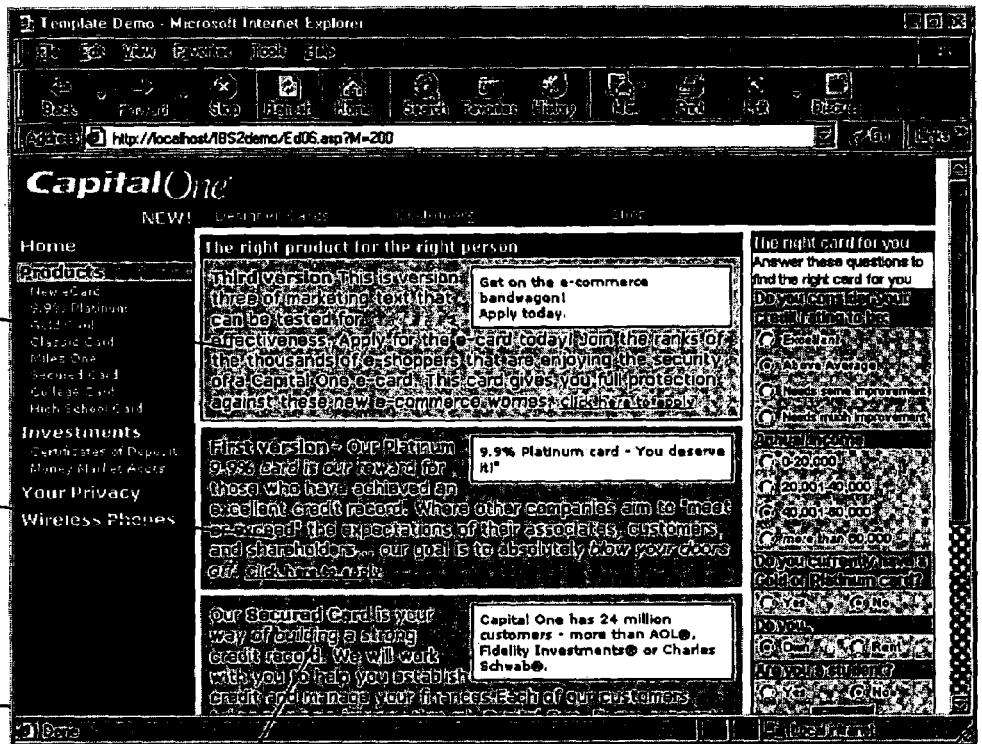

The content may also include various versions of the information associated with each credit card offered by the financial institution. FIGS. 4A-4C show Web page rendering examples of alternate versions of content representing credit card offers from a financial institution. FIG. 4A shows a Web page 400 displayed at a client node 150 via browser software. Web page 400 includes a first version 410 that shows first data that can describe customized information concerning one type of credit card available from the provider. First version 420 shows another credit card offered by the provider as well, while version 425 shows marketing information for another type of credit card. FIG. 4B illustrates a second version 430 positioned in the same location as first version 410. Second version 430 represents alternate content associated with the same credit card solicitation associated with first version 410. FIG. 4C illustrates a third version 440 positioned in the same location as first version 410. Third version 440 represents alternate content associated with the same credit card solicitation associated with first and second versions 410, 430.

Figure 4D:
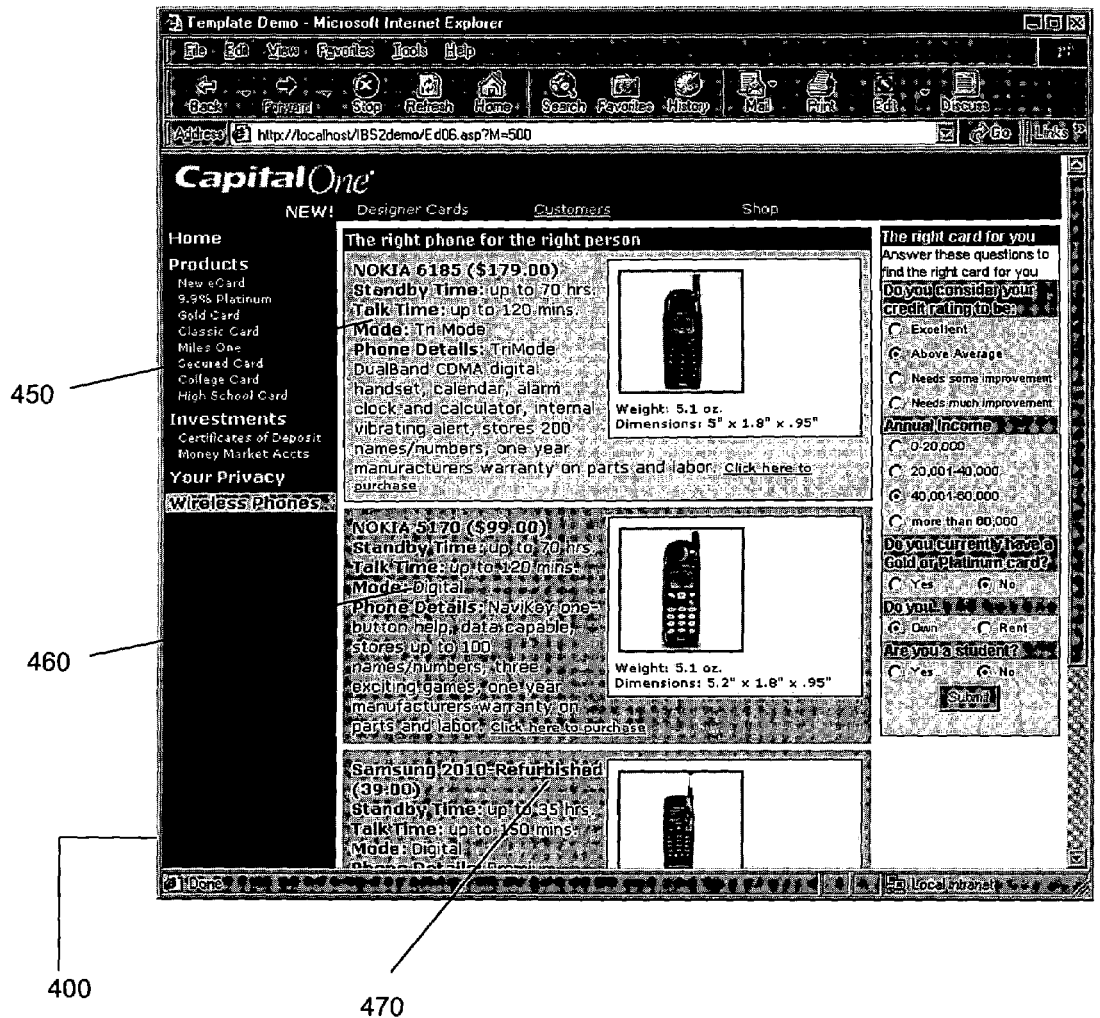
Figure 4E:
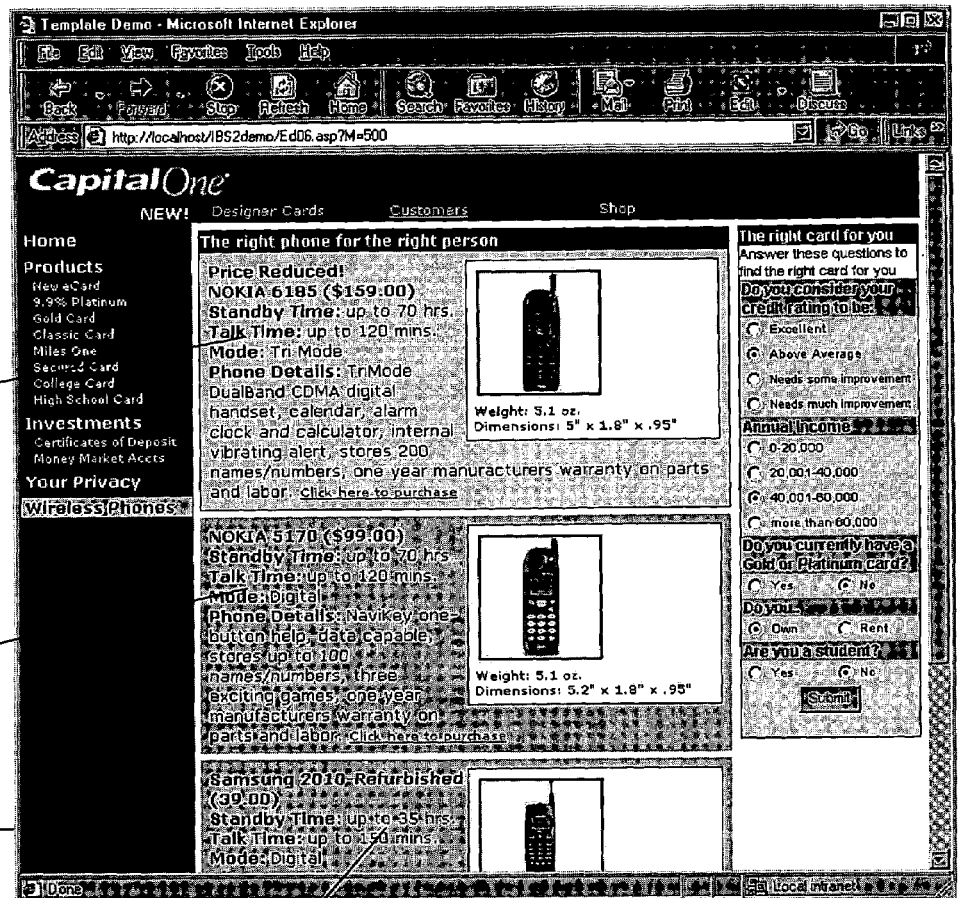
Figure 4F:
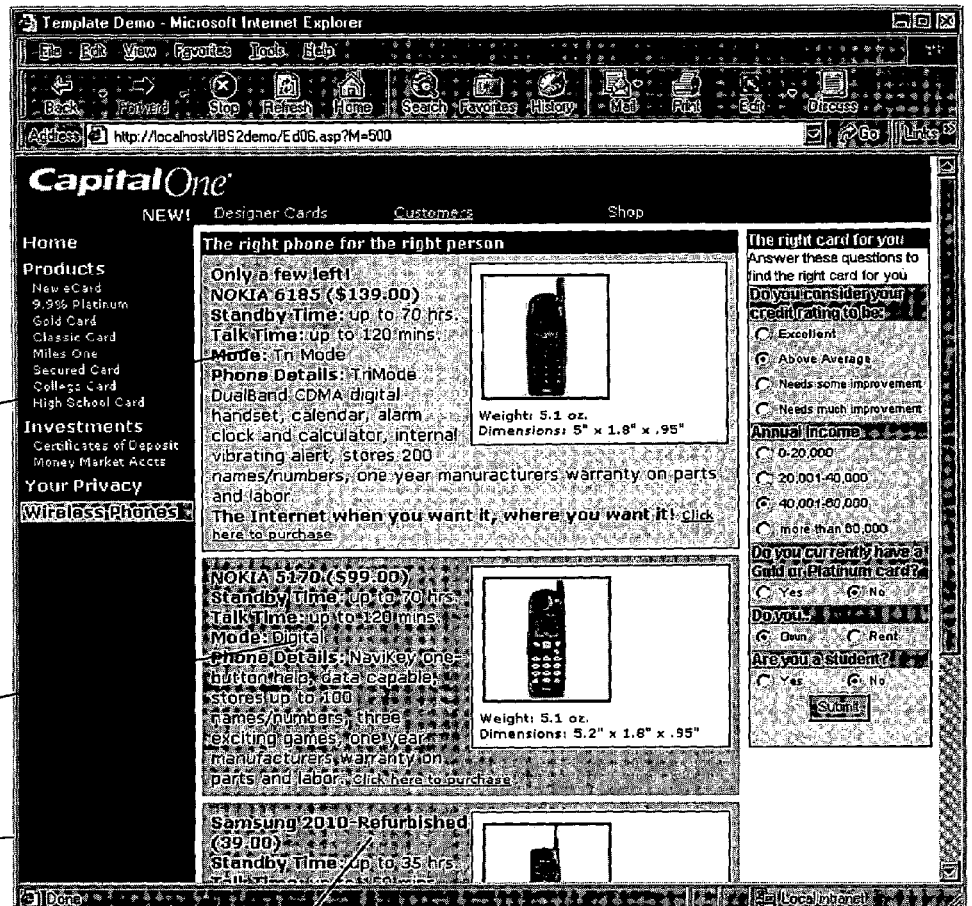

FIGS. 4D-4F show further examples of a Web page rendering examples of alternate versions of content representing actual products offered by a provider, in this case wireless phones. FIG. 4D illustrates Web page 400 displaying first versions, 450, 460 and 470, of wireless phones that can be purchased by the user from the provider. FIG. 4E shows version 480, which is an alternate rendering of version 450. FIG. 4F shows version 490, which is an alternate rendering of versions 450 and 480.

Thus, as can be seen from the examples of FIGS. 4A-4F, the content selected by a provider may represent a plurality of types of content, wherein the content itself may represent alternate products or renderings of existing products or services offered by the provider.

Returning to FIG. 3, the defined rules associated with the content may include code that governs attribute information associated with existing content defined in Step S.310. These rules may govern, for example, frequency of the renderings of the content, color of the content, characteristics of multimedia files or links, and specific positioning or font of content rendered on Web page 400.

Figure 4G:
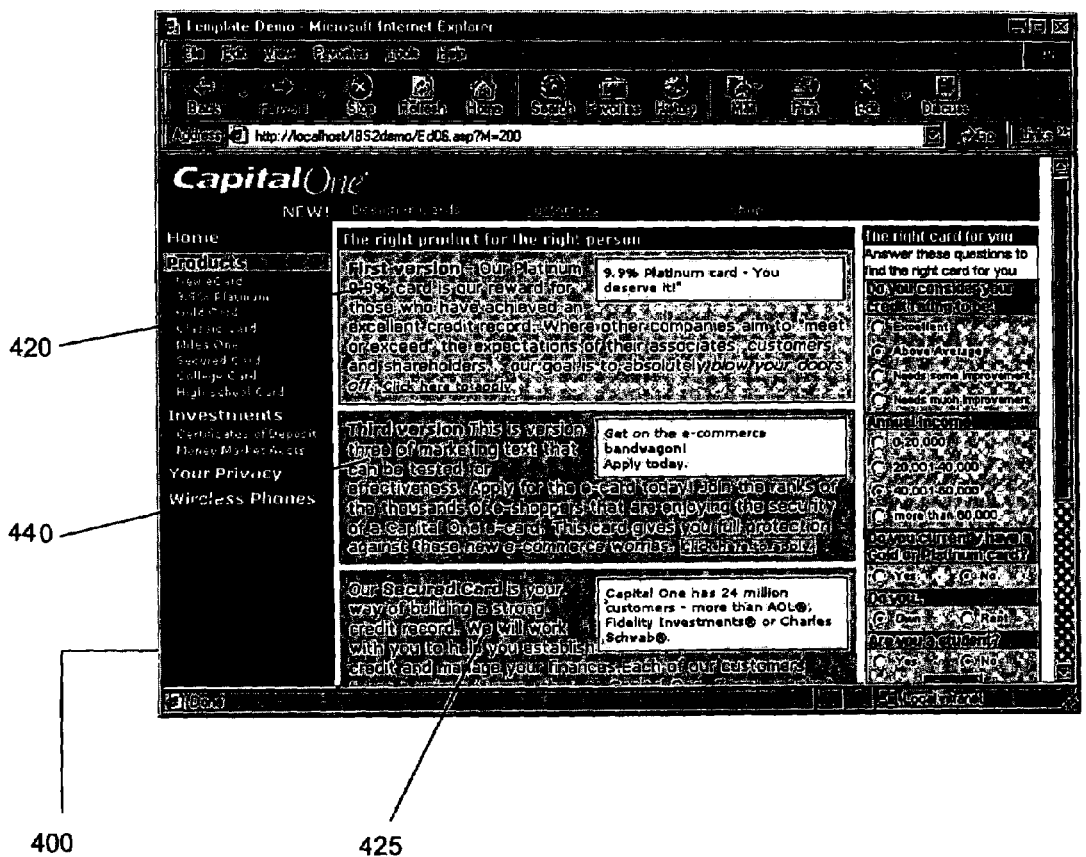
FIGS. 4G-4J show the Web page displayed in FIG. 4c, after predefined rules are applied to alter the content, in accordance with methods and systems consistent with the invention.
Figure 4H:
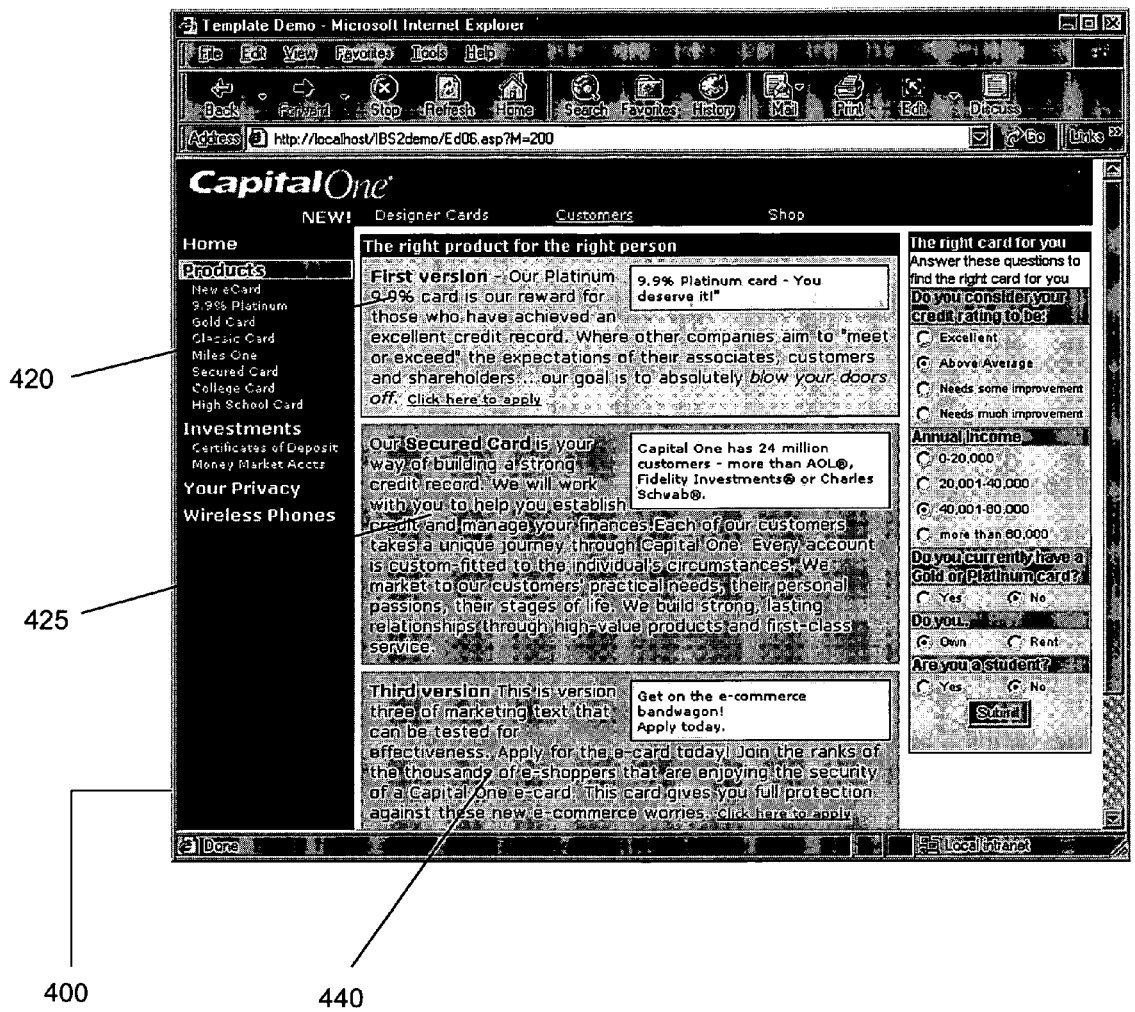

FIGS. 4G and 4H show the results of when the rules defined in data store 130 alter the position of the third version 440 described in FIG. 4C. Referring to FIG. 4C, third version 440 is shown at a first position "on top" of version 420. FIG. 4G illustrates Web page 400 adjusted by rules governing position of content, in this case third version 440 is positioned below version 420. FIG. 4H illustrates Web page 400 adjusted by rules governing position, in this case third version is positioned below version 425, and version 420 is positioned above version 425.

Figure 4I:
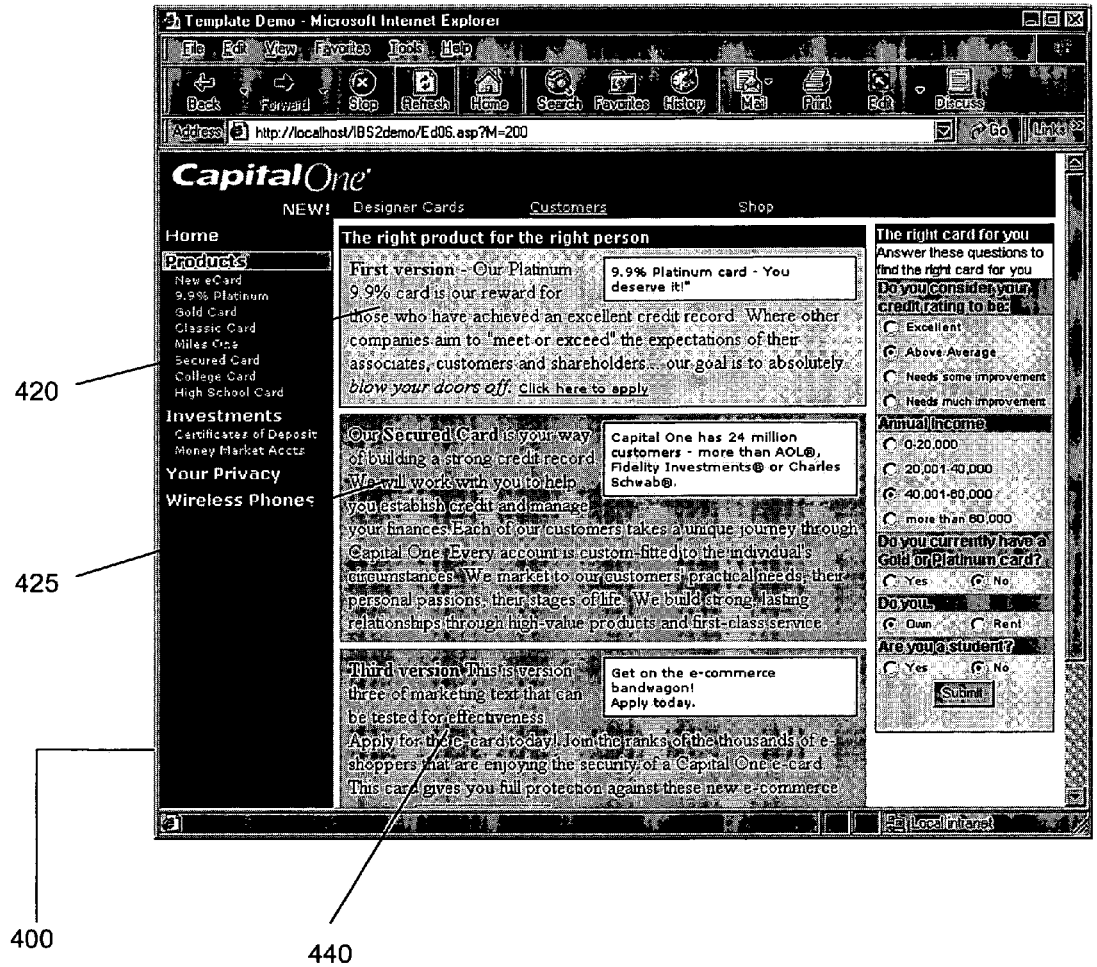
Figure 4J:
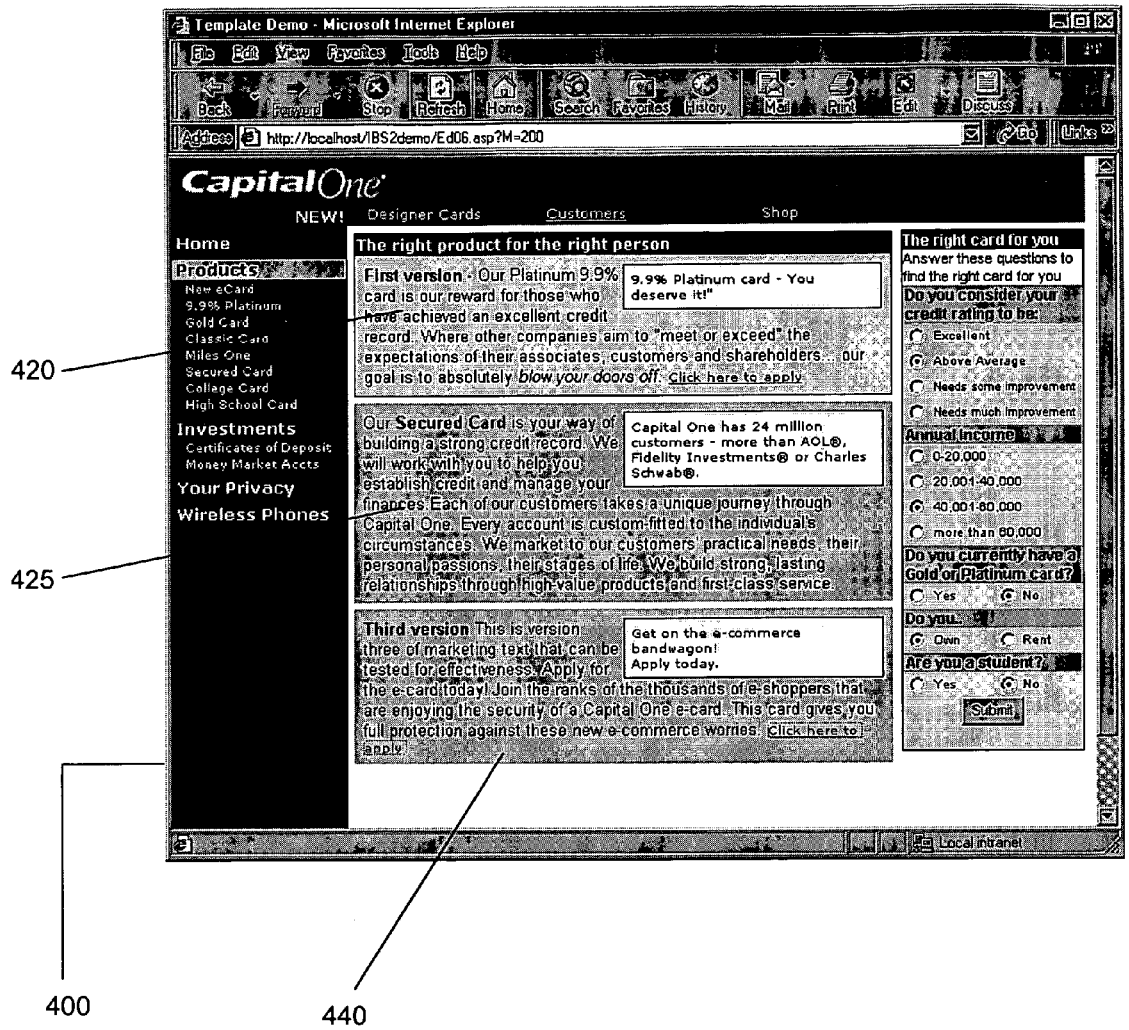

FIGS. 4I and 4J show the results of when the rules defined in Step 410, alter the font style of Web page 400 rendered in FIG. 4H. As can be seen, FIG. 4I illustrates versions 420, 425 and 440 displayed in a font style different from that shown in FIG. 4H, while FIG. 4J illustrates the same three versions displayed in a font style different from that shown in FIGS. 4H and 4I.

Accordingly, the content rules stored in data store 130 may be defined to alter the display of existing content by changing attributes, such as font and position These rules may be defined to alter these attributes in combination or individually, depending on the results of analytical program 115, which process the effectiveness of a particular rendering presented to users located at the client nodes 150.

As previously described, the rules and content defined by methods, systems and articles of manufacture consistent with the present invention are not limited to the above described examples, rather only by the specific providers marketing or advertising their respective products and services. That is, the disclosed invention may be applied to a wide range of products and services which providers can solicit using a Web-based content delivery scheme.

Returning to FIG. 3, once data store 130 has been initialized with content and content rules, the analytical program is checked to determine whether it has been programmed and set by analysis system 170 (Step S.320). Upon determining that analytical program 115 has not been programmed, analysis system 170 downloads code representing analytical program rules associated with performing market analysis on user response data (Step S.330). In an alternate embodiment of the present invention, Step S.330 may be performed to determine whether analytical program 115 needs to be updated with new analytical program rules by analysis system 170.

Analysis system 170 may be an outside analysis entity, generally associated with a provider governing Web server 110. Analysis system 170 may perform detailed market and advertising analysis, and predication statistical analysis on the effectiveness and proposed effectiveness of content rendered in Web pages provided by Web server 110. Analysis system 170 may also generate analytical program rules that enable analytical program 115 to automatically make decisions on the effectiveness of presented content, based on the collected user response data. For example, one type of analytical program rule may analyze the percentage of time a number of versions of a Web page that has been rendered by Web server 110, in relation to a proportional "click-through" percentage for each particular version. Based on this analysis, the analytical program rule may adjust the rendering time for the version with the highest "click-through" rate. This example may be illustrated as follows:

Analytical Program Rule:
If version N's "click-through" rate increases by 10% for testing period X, proportionally adjust rendering time of version N by 25%.

TABLE 1

| | Content Version | | |
|---|---|---|---|
| | Version 1 | Version 2 | Version 3 |
| Rendering Time % | 33% | 33% | 33% |
| Click Through % | Down 10% | Up 15% | No change |

Analytical program 115 analyzes the above collected information, recognizes that Version 2 in Table 1 meets the criteria for the defined rule, and adjusts the rendering time of Version 2 as shown below in Table 2.

TABLE 2

| | Content Version | | |
|---|---|---|---|
| | Version 1 | Version 2 | Version 3 |
| Adjusted Rendering Time % | 21% | 58% | 21% |
| Click Through % | Not collected | Not collected | Not collected |

As described, Analysis system 170 may generate a wide range of analytical program rules based on a large number of conditions. That is, the analytical program rules downloaded to analytical program 115 are not limited to the above example, and may include rules that govern attributes other than rendering time such as content attributes (i.e. font, color, position, URL highlighting etc.).

Furthermore, analytical program rules may be include a combination of rules such that several content and Web page conditions are evaluated concurrently and multiple adjustments to the content may be executed. For example, in addition to the number of "click-throughs" being monitored and considered by the analytical program 115, the day of the week, or even the time of day, may also be considered. That is, user response data may indicate that a particular version is more popular on a weekend, or during selected hours of a day. Thus, a rule may include adjustments on rendering time based on not only "click-through" rate, but when the version is most popular. As described above, Version 2 may be rendered 58% of the time only on Saturdays, while version one is rendered 50% of the time on Mondays through Thursdays, from 6:00 P.M. to 10:00 P.M.

As can be seen, an endless number of combinations of user response data, and associated content adjustments may be incorporated into the analytical program rules executed by analytical program 115, and are not limited to the example described above.

Returning back to FIG. 3, once the rules and content have been defined and analytical program has been programmed, the content and rules are stored in data store 130 (Step S.320). In an alternate embodiment of the invention, step S.320 may be performed after the content and content rules are defined in step S.310.

When a request for a Web page is received by Web server 110, middleware program 112 executes an algorithm to determine what content needs to be built into the Web page before it is served to the client. In one embodiment of the invention, for an initial request for a Web page (i.e. a page that has never been rendered by Web server 110), middleware program 112 may first determine the type of user generating the request. This may be performed by retrieving user identification information associated with the user requesting the Web page, using techniques well known in the art, such as cookies, and checking the identification information against a user profile resource. This process allows the user, or a group of users, to be associated with particular social, economic, educational and commercial interests. The process of utilizing user or group profiles for classifying users for target marketing is well known in the art, and the present invention can implement any number of these techniques, as long as the required user information is retrieved and is available for processing.

Upon determining the type of user initially requesting the Web page, middleware program 112 accesses data store 130 to determine the associated content to be served to the user, via the Web page. Middleware program 112 uses the user's identification and profile information to select available content alternatives stored in data store 130. The rules associated with the content in data store 130 are appended with the selected content, such that the rendering of the content is subject to the restrictions defined by its assigned content rules. Middleware program 112 applies the rules (Step S.330), and builds the content into the requested Web page and inventories the content for future analysis. The updated Web page is then served to the client node 150 where the user requesting the page is located. Client node 150 executes its browser application to present the updated Web page to the user (Step S.340).

In the event a request is received for a Web page that has already been served by Web server 110, middleware program 112 selects adjusted content and content rules based on results from the analytical program 115. The need for individual user profiling may be replaced with user group profiling. This process is associated with the analytical program 115 analyzing user response data and modifying the content and content rules stored in data store 130. As described above, middleware program 112 applies the content rules to the content and renders an adjusted Web page that is also used for subsequent market analysis.

Figure 5:
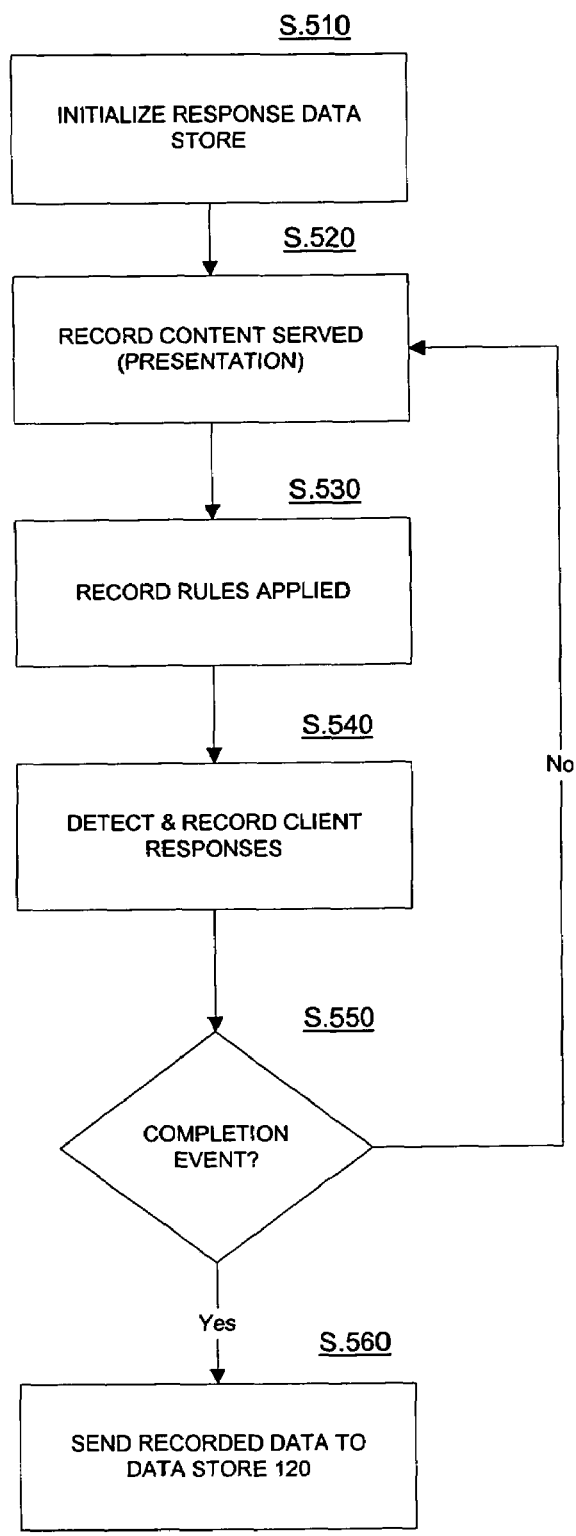
FIG. 5 is an exemplary flow chart of the steps performed by the data collection step shown in FIG. 2, in accordance with methods and systems consistent with the invention.

FIG. 5 is an exemplary flow chart of the data collection process described in FIG. 2. The process begins with the initialization of client side data store 160 (Step S.510). This step makes sure that each client side data store 160 is empty and can receive new information. The requested Web page provided to the client node 150 from the Web server 110, includes an algorithm implemented using client side scripting, applets or other similar processing techniques, for storing the content rendered (Step S.520) into the client side data store 160. The algorithm further is implemented to store the content rules applied to the content (Step S.530), as well as any other information pertinent to the identification of the type of data rendered at the client node 150.

Once the Web page is received and rendered at each client node 150, respective users "browse" the Web page, generating user activated events. These events may be associated with the user making link selections on the Web page to other pages, via URLs, mouse movements, screen scrolling, window resizing, or any other user initiated event. User behavior is monitored by capturing these events and storing them into client side data store 160 (Step S.540), using client side scripting, applets, or other similar processing techniques. For example, client side scripting languages such as JavaScript include commands that enable a program to recognize selected "events" performed by users. The client side script served to each client node by Web server 110, uses the client side script commands to collect detailed user response information. This process enables the present invention to recognize not only well known user events, such as "click-throughs", but whether selected content is actually in-view to the users. As the user generates the events, the client side data store 160 accumulates the event data dynamically.

The client side script may collect detailed event data by using commands well known in Web-based programming languages, such as Javascript and VBScript. For example, to detect a "mouseover" event, which is an event associated with detecting when a user's mouse pointer moves over a component of a Web page, client side Web-based programming commands are implemented to target selected components on the Web page. For instance, the target components may include, but are not limited to, an image, text, paragraph, hyperlinks or any attribute of a Web page. When a user's mouse pointer moves over a target component, the client side script recognizes this movement based on the execution of a command triggered by the mouse pointer's position over a targeted component. Subsequently, the client side script makes a record of the triggered event in the client side data store. Accordingly, the placement of a user's mouse over targeted components of a rendered Web page may be recognized by the client side script, and stored as user events for analysis by Web server 110.

Figure 9A:
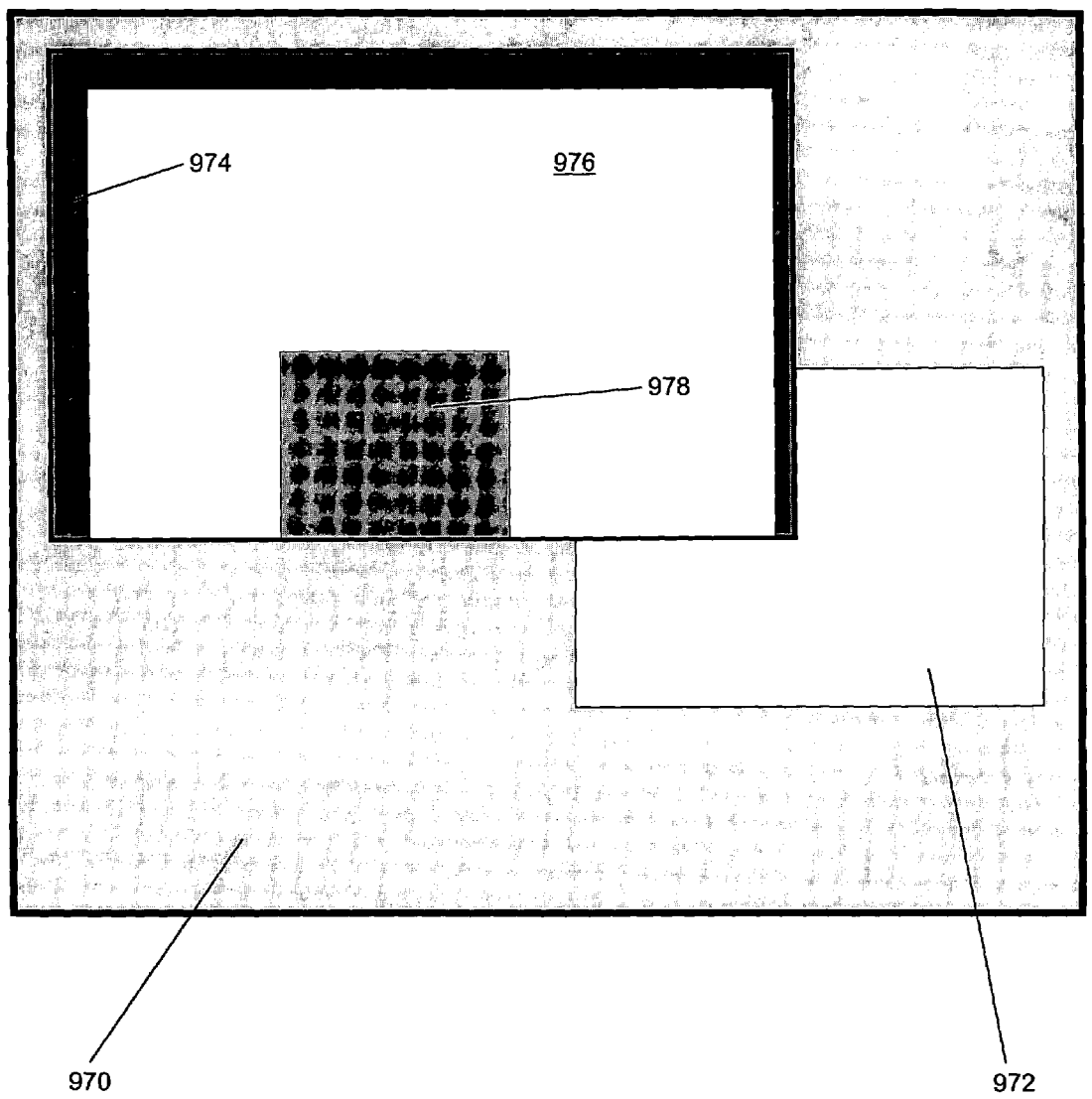
FIGS. 9A-9C are exemplary block diagrams of a computer display rendering a Web page, in accordance with methods and systems consistent with the invention.
Figure 9B:
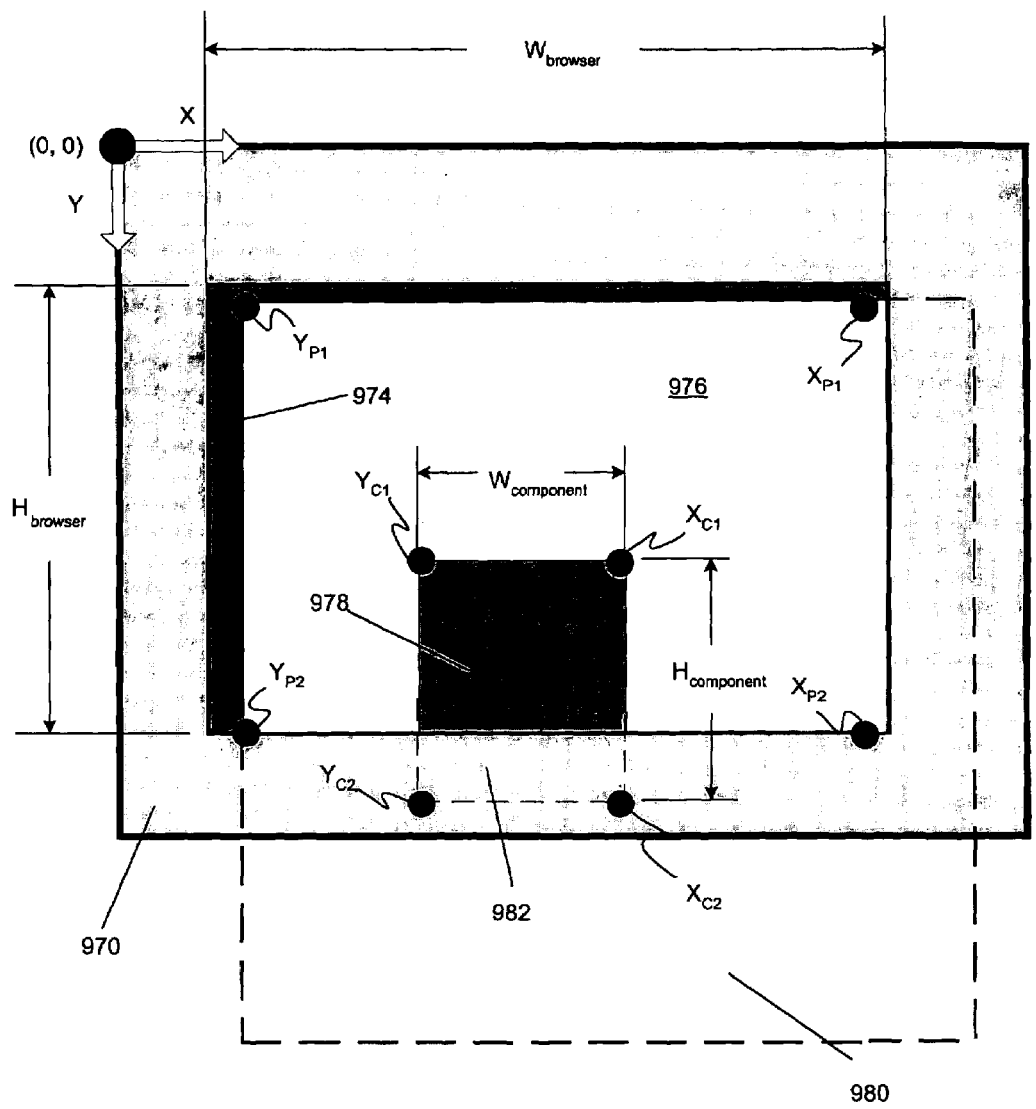
Figure 9C:
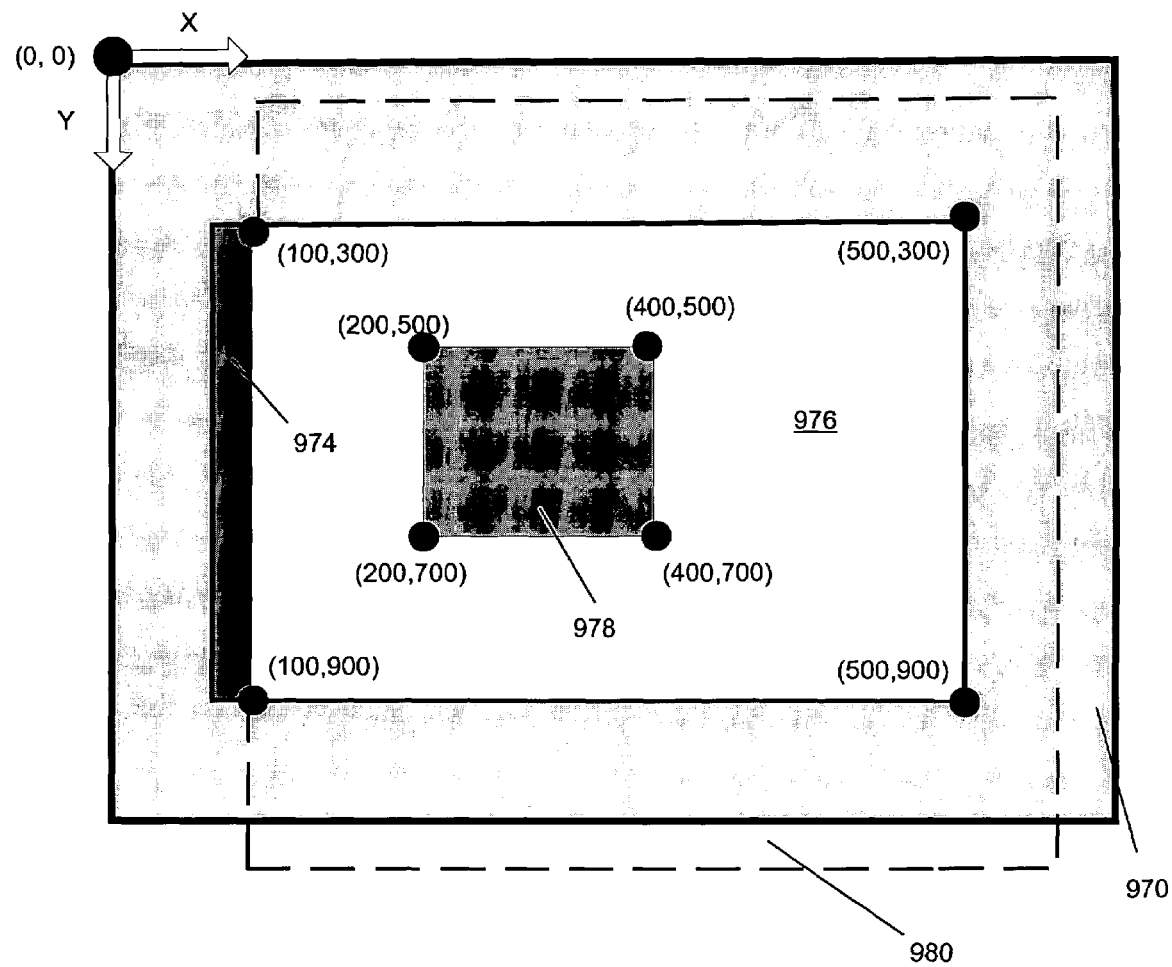

To monitor the in-view features of the present invention, the client side script uses the well known Web-based programming commands to collect coordinate and size information related to the browser window, the Web-page rendered within the browser window and components rendered within the Web page. This information is collected and stored in client side data store 160, along with the other event data. A plurality of user browsing activities affect how the client side script, or Web server 110, determines whether a target component is actually viewable by a user. The activities may include, but are not limited to, scrolling and resizing browser windows. Activities such as these affect the position of the components and Web page rendered in the browser window. The size of the browser window must be taken into account as well, because a user may adjust the size of browser window while viewing the Web page. FIGS. 9A-9C illustrate an exemplary client side display that includes a Web page rendered within a browser window.

As shown in FIG. 9A, a client side computer display 970 presents a couple of windows 972 and 974, representing applications running on a client node 150. Window 974 represents a Web browser application being executed at the client node 150, while window 972 represents any other software application that may be executing while the browser software is currently running. Window 974 includes a Web-page 976 and a target component 978, which is located on Web page 976. Target component 978 may be associated with a number of different types of Web-page content as previously described. As can be seen in FIG. 9A, Web page 976 and target component 978 are partially in view.

The partial view of Web page 976 and component 978 is better illustrated in FIG. 9B. FIG. 9B includes display 970, Web browser window 974, and target component 978 as shown in FIG. 9A. Additionally, FIG. 9B includes a representation of an unseen portion 980 of Web page 976, and an unseen portion 982 of target component 978. FIG. 9B also includes values $W_{browser}$, $H_{browser}$, $Y_{P1}$, $Y_{P2}$, $Y_{C1}$, $Y_{C2}$, $X_{P2}$, $X_{P2}$, $X_{C1}$, $X_{C2}$, $W_{component}$, and $H_{component}$, which will be described in further detail later. In order for the client side script to determine whether a component is in view to a user, detailed positional information is collected and stored in client side data store 160.

The in view collection process begins when selected events occur, initiated by the user viewing the Web browser application at client node 150. The selected events may include, but are not limited to, scrolling or resizing of the browser, and loading of a Web page. The Client side script recognizes these triggers and begins to collect in view characteristic data. Coordinate information based on the position of the windows in display 970 are needed to determine the in view status of a target component. As shown in FIG. 9B the center axis for a coordinate grid associated with Web based displays is located at the upper left hand corner of display 970. The coordinates (X, Y) for the center axis represented is (0, 0). Quadrant IV of the (X,Y) graph represents the positive axis quadrant for the (X, Y) axis represented in FIG. 9B. That is, the X axis in positive values of pixels from left to right, starting at the center axis, and the Y axis run in positive values of pixels from top to bottom, starting at the center axis.

Once a selected event occurs, the client side script executes commands to calculate the coordinates of the top of Web page 976 that is viewable in browser window 974, and is represented by coordinates $Y_{P1}$ and $X_{P1}$.

Coordinates $Y_{P1}$ and $X_{P1}$ are represented in (X,Y) format as:

$$Y_{P1} = (Y_{P1X}, Y_{P1Y})$$

$$X_{P1} = (X_{P1X}, X_{P1Y})$$

For the exemplary illustration in FIG. 9B, coordinate $Y_{P1}$ is determined using well known client side scripting commands. Coordinate $X_{P1}$ is unknown because of the size of window 974 and Web page 976 are dynamic based on user activities. However, because of the characteristics of the X,Y graph superimposed on display 970, the following conditions are known:

$$Y_{P1X} = Y_{P2X} \tag{A}$$

$$X_{P1X} = X_{P2X} \tag{B}$$

$$Y_{P1Y} = X_{P1Y} \tag{C}$$

$$Y_{P2Y} = X_{P2Y} \tag{D}$$

Accordingly, coordinate $X_{P1Y}$ is known because of condition (C).

As shown in FIG. 9B, portion 982 of component 978 is not viewable in Web page 976. User activities such as resizing windows and scrolling affect the in view portion of Web page 976 and component 978. Accordingly, to determine what are the actual in view portions of Web page 976 and component 978, the client side script executes known Web-based programming language commands to collect the known current height $H_{browser}$ and width $W_{browser}$ of browser window 974.

Once this information is generated, the client side script may now find the true viewable bottom coordinates $Y_{P2}$ and $X_{P2}$ and missing coordinate $X_{P1X}$ of coordinate $X_{P1}$ of the viewable Web page in the viewable browser window 974.

Coordinates $Y_{P2}$ and $X_{P2}$ are represented in (X,Y) format as:

$$Y_{P2}=(Y_{P2X}, Y_{P2Y})$$

$$X_{P2}=(X_{P2X}, X_{P2Y})$$

$Y_{P2}$ and $X_{P1X}$ are generated by first performing a pair of functions that adds the current height of the browser window $H_{browser}$ to the Y coordinate of coordinate $Y_{P1}$ and adds the current width $W_{browser}$ to the X coordinate of coordinate $Y_{P1}$, respectively. This is represented by functions (1) and (2) below:

$$Y_{P2Y}=H_{browser}+Y_{P1Y} \quad (1)$$

$$X_{P1X}=W_{browser}+Y_{P1X} \quad (2)$$

Since the coordinates of $Y_{P1}$ and $X_{P1}$ and coordinate $Y_{P2Y}$ are now known, the rest of the coordinates for $Y_{P2}$ and $X_{P2}$ can be calculated using conditions (A), (B) and (D).

Next, the client side script executes commands to calculate the coordinates of target component 978 within Web page 974. Coordinates $Y_{C1}$ and $X_{C1}$ represent the coordinates of the top of component 978.

Coordinates $Y_{C1}$ and $X_{C1}$ are represented in (X,Y) format as:

$$Y_{C1}=(Y_{C1X}, Y_{C1Y})$$

$$X_{C1}=(X_{C1X}, X_{C1Y})$$

Since the component was generated in the Web page at Web server 110, the position of component 978 in relation to Web page 976 may be determined during client side scripting known in the art. For example, if it is known that the component is 100 pixels down from the top edge of Web page 976 and 100 pixels from the left edge of Web page 976, the actual coordinates of $Y_{C1}$ of component 978 in relation to browser window 974, which is in relation to display 970, may be calculated as follows:

$$Y_{C1X}=Y_{P1X}+100$$

$$Y_{C1Y}=Y_{P1Y}+100$$

Since the design of the Web page is controlled by Web server 110, the dimensions of component 978, such as the height $H_{component}$ and width $W_{component}$ of component 978, may be determined using client side scripting known in the art. Once these values are determined, the bottom coordinates $Y_{C2}$ and $X_{C2}$ and coordinate $X_{C1}$ of the target component in relation to browser window 974 may be calculated.

Coordinates $Y_{C2}$ and $X_{C2}$ are represented in (X,Y) format as:

$$Y_{C2}=(Y_{C2X}, Y_{C2Y})$$

$$X_{C2}=(X_{C2X}, X_{C2Y})$$

It should be noted that because of the characteristics of the X,Y graph superimposed on display 970, the following conditions are known:

$$Y_{C1X}=Y_{C2X} \quad (D)$$

$$X_{C1X}=X_{C2X} \quad (F)$$

$$Y_{C1Y}=X_{C1Y} \quad (G)$$

$$Y_{C2Y}=X_{C2Y} \quad (H)$$

Using condition (G), $X_{C1Y}$ is now known.

$Y_{C2}$ and $X_{C1X}$ may be calculated by performing functions (3) and (4) below:

$$Y_{C2Y}=H_{component}+Y_{C1Y} \quad (3)$$

$$X_{C1X}=W_{component}+Y_{C1X} \quad (4)$$

Using conditions (D), (F) and (H), coordinates $Y_{C2X}$, $X_{C2X}$ and $X_{C2Y}$ are now known.

Now that all of the coordinates shown in FIG. 9B are calculated, the coordinates of target component 978 are compared to the coordinates of the viewable Web page rendered in the browser window 974 to determine whether the target component is entirely positioned in browser window 974. This enables the client side script to determine whether the target component is in full view or not. This comparison process may be performed a variety of ways, including checking X and Y coordinates of both the Web page and component.

In one embodiment of the invention, to determine the Y bottom coordinate in view value of coordinate $Y_{C2}$ of target component 978, client side script performs function (5):

$$Y_{C2\ bottom\ in\ view\ value}=Y_{C2Y}-Y_{P2Y} \quad (5)$$

If $Y_{C2\ bottom\ in\ view\ value}$ is equal to 0 or is a negative number, the component is in 100% full view within browser window 974.

To determine the X right side coordinate in view value of coordinate $X_{C2}$ of target component 978, client side script performs function (6):

$$X_{C2\ right\ in\ view\ value}=X_{C2X}-X_{P2X} \quad (6)$$

If $X_{C2\ right\ in\ view\ value}$ is equal to 0 or is a negative number, the component is in 100% full view within browser window 974.

To determine the Y top coordinate in view value of coordinate $Y_{C1}$ of target component 978, client side script performs function (7):

$$Y_{C1\ top\ in\ view\ value}=Y_{C1Y}-Y_{P1Y} \quad (7)$$

If $Y_{C1\ top\ in\ view\ value}$ is equal to 0 or is a positive number, the component is in 100% full view within browser window 974.

To determine the X left side coordinate in view value of coordinate $X_{C1}$ of target component 978, client side script performs function (8):

$$X_{C1\ left\ in\ view\ value}=X_{C1X}-X_{P1X} \quad (8)$$

If $X_{C1\ left\ in\ view\ value}$ is equal to 0 or is a positive number, the component is in 100% full view within browser window 974.

As seen, the coordinates of the windows and components rendered in browser 974, are generated in relation to display 970, and the current position and size of browser window 974. As previously mentioned, there are a number of different ways in which the coordinate information may be analyzed to determine whether target components are in view or not, and are not limited by the above exemplary procedures.

In addition, client side script may utilize the coordinate information to determine the proportion of viewable components in relation to the web page 976. This may be done a variety of ways for each edge of the component, and may only be performed when it is determined using functions (5)-(8) that a portion of the component 978 is not in full view. For example, when determining the proportion of a component in view using the bottom coordinate of Web page 976, client side script may perform the following functions:

$$Y_{proportion-bottom}=(Y_{P2Y}-Y_{C1Y})/H_{component} \quad (9)$$

$Y_{proportion-bottom}$ shows the ratio of the viewable Y coordinate portion (or height) of component 978 in relation to the total height of the component, for components bounded by the bottom coordinates of Web page 976.

$$Y_{proportion\text{-}top} = (Y_{C2Y} - Y_{P1Y})/H_{component} \quad (10)$$

$Y_{proportion\text{-}top}$ shows the ratio of the viewable Y coordinate portion (or height) of component 978 in relation to the total height of the component, for components bounded by the top coordinates of Web page 976.

$$X_{proportion\text{-}right} = (X_{P1X} - Y_{C1X})/W_{component} \quad (11)$$

$X_{proportion\text{-}right}$ shows the ratio of the viewable X coordinate portion (or width) of component 978 in relation to the total width of the component, for components bounded by the right side coordinates of Web page 976.

$$X_{proportion\text{-}left} = (X_{C1X} - Y_{P1X})/W_{component} \quad (12)$$

$X_{proportion\text{-}left}$ shows the ratio of the viewable X coordinate portion (or width) of component 978 in relation to the total width of the component, for components bounded by the left side coordinates of Web page 976.

Functions (9)-(12) are ratio values, and may be converted into percentage values that may not exceed 100%.

FIG. 9C shows an exemplary block diagram of display 970 illustrated in FIG. 9B. In FIG. 9C, Web page 976 has been scrolled down, thus moving target component 978 further "up" on display 970. For exemplary purposes, FIG. 9C includes coordinate information associated with coordinates $Y_{P1}, Y_{P2}, Y_{C1}, Y_{C2}, X_{P1}, X_{P2}, X_{C1}, X_{C2}$. However to better illustrate the in view process, the following example will follow the same process as described for FIG. 9B.

After the client side script recognizes that the Web page has been scrolled, commands are executed to perform the operations previously described for FIG. 9B, such as:

$Y_{P1} = (100, 300)$, and using condition (C), it is determined that $X_{P1Y} = 300$;

Using known commands to collect the dimensions of Web page 976:

$W_{browser} = 400$;

$H_{browser} = 600$;

Using functions (1) and (2):

$$Y_{P2Y} = 600 + 300 = 900; \quad (1)$$

$$X_{P1X} = 400 + 100 = 500; \quad (2)$$

Using conditions (A), (B) and (D), it is determined:

$$Y_{P2X} = Y_{P1X} = 100; \quad (A)$$

$$X_{P2X} = X_{P1X} = 500; \quad (B)$$

$$X_{P2Y} = Y_{P2Y} = 900; \quad (D)$$

Collecting design information for component 978, it is determined that:

$Y_{C1} = (200, 500)$ $H_{component} = 200$;

$W_{Component} = 200$;

Using condition (G):

$X_{C1Y} = Y_{C1Y} = 500$;

Using functions (3) and (4):

$$Y_{C2Y} = 200 + 500 = 700; \quad (3)$$

$$X_{C1X} = 200 + 200 = 400; \quad (4)$$

Using conditions (D), (F) and (H):

$$Y_{C2X} = Y_{C1X} = 200; \quad (D)$$

$$X_{C2X} = X_{C1X} = 400; \quad (F)$$

$$X_{C2Y} = Y_{C2Y} = 700; \quad (H)$$

Accordingly, all of the coordinates of component 978 have been calculated. To generate proportional in view information, client side script may perform functions (5)-(8) as follows:

$$Y_{C2\ bottom\ in\ view\ value} = Y_{C2Y} - Y_{P2Y} = 700 - 900 = -200; \quad (5)$$

$$X_{C2\ right\ in\ view\ value} = X_{C2X} - X_{P2X} = 400 - 500 = -100; \quad (6)$$

$$Y_{C1\ top\ in\ view\ value} = Y_{C1Y} - Y_{P1Y} = 500 - 300 = 200; \quad (7)$$

$$X_{C1\ left\ in\ view\ value} = X_{C1X} - X_{P1X} = 200 - 100 = 100; \quad (8)$$

Since functions (5)-(8) determine that component 978 is 100% in full view, proportional calculations do not need to be generated. However, if it is determined that a portion of component is not in view, the appropriate coordinate side would have a proportion calculation performed against it [i.e. functions (9)-(12)], to generate an in view percentage characteristic.

Accordingly, a number of different in view characteristic data may be generated using the coordinate information calculated by the client side script. In an alternate embodiment of the invention, client side script stores the coordinate information in data store 160, and when analytical program 112 receives this information, the above in view analysis may be performed at the Web server 110.

The in view data collected by the client side scripts may provide information such as data indicating whether content is actually viewable by respective users, mouse movements across a Web page, position of the Web page based on screen scrolling, length of time a mouse pointer is positioned in a determined location of the Web page, and a plurality of other "detailed" user behavior events associated with browsing. The potential for an enormous amount of user response data to be collected may be controlled by the programming of the client side script implemented by Web server 110. In other words, Web server 110 may be programmed to provide client side scripts that monitor general user response data, or numerous detailed user response data, depending upon the level of granularity of market analysis desired by the Web server.

Once a client side trigger event occurs in a respective client node 150 (Step S.550), the information accumulated in client side data store 160 is ready for transmission to data store 120 and Web server 110 for processing. The client side trigger event may be associated with a plurality of customized events, including but not limited to, the client side data store 160 being filled up to a threshold limit, the browser being closed, or a user selecting another Web page. The provider of Web server 110 may determine the types of client side trigger events they wish to operate with, and have them programmed into the present invention's monitoring script.

The event data is sent back to Web server 110 by executing a routine associated with a URL appended to the Web page served at the client node 150. The Web page sent to the client node 150, includes a portion with a URL dedicated to the dynamic transmission of the collected data to Web server 110. The routine appends the collected user event data from the client data store 160, onto the dedicated URL. That portion of the Web page is dynamically reloaded, forcing the collected user event data to be sent to the Web server 110 (Step S.560). Upon receipt of the collected user event data, Web server 110 forwards it to data store 120 for storage. Thus, Web server 110 is continuously receiving user response data from each client node 150 being served by the Web server 110, giving the server continuous marketing information from which to base analysis of the content rendered to the client nodes 150.

Figure 6:
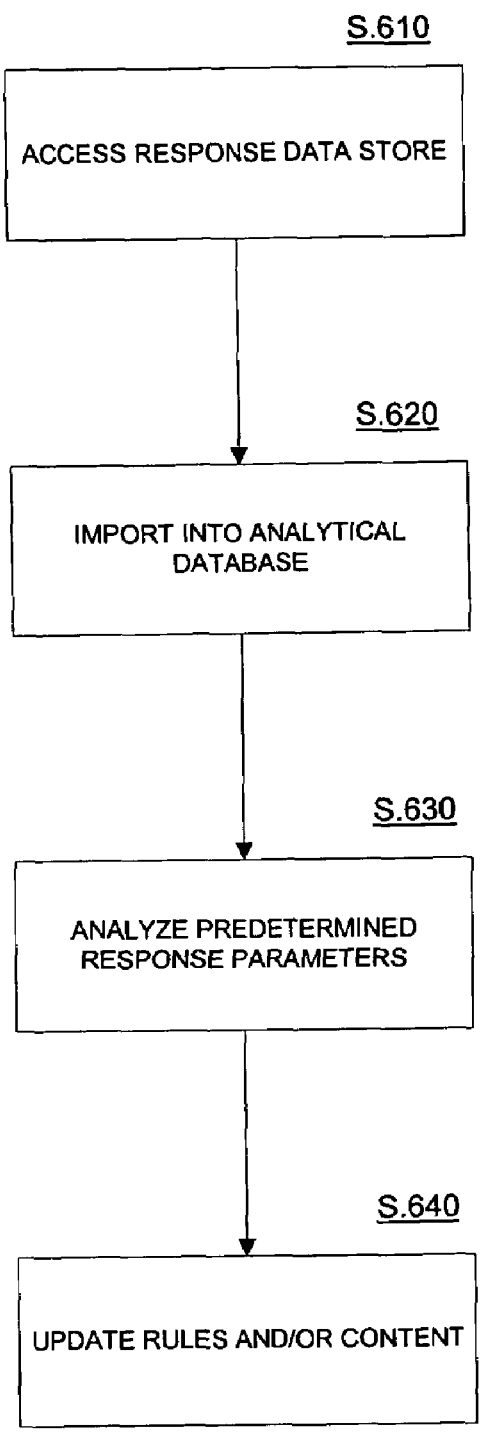
FIG. 6 is an exemplary flow chart of the steps performed by the analyze responses step shown in FIG. 2, in accordance with methods and systems consistent with the invention.

FIG. 6 is an exemplary flow chart of the analyze responses process described in FIG. 2. The process begins when the collected user responses stored in data store 120 are accessed by Web server 110 (Step S.610). Analytical program 115 retrieves the collected user response data and initiates an analysis program including the analytical program rules received by analysis system 170 (Step S.620). Analytical program 115 determines whether the Web page rendered at each client node 150, with its associated content, needs adjustment based on the collected user response data. Analysis may include correlating predetermined threshold values with the user response data. That is, if the user response data indicates that particular content was viewable to a user for a certain amount of time, based on the in-view features of the user response collection operations performed by the client side scripts, that may indicate the user was viewing the content for that certain time frame. Accordingly, a threshold value associated with particular content, and the amount of time it was viewable, may be incorporated into the analytical program rules programmed into analytical program 115. Analytical processing may include comparing the threshold value with the collected user response data to make a determination whether the content or rules stored in data store 130 need adjustment. The correlation processing performed by analytical program 115 may be associated with a plurality of user events, such as link selections, scrolling, maximizing/minimizing windows. Analytical program 115 processes the results of the analyzed user response data, and updates the content rules, and/or content stored in data store 130, automatically.

As previously mentioned, a multitude of combinations of analytical program rules may be applied concurrently with the analysis of a plurality of user response data stored in data store 120. For example, consider a Web page rendered by Web server 110 including an application that requires users to fill out selected fields requesting information, such as a credit card application. For this example, user response data collected by each client side script may include information regarding whether or not a respective user finished completing the application. In the case of incomplete applications, the client side scripts may collect information indicating where in the application a user stopped entering data, where the user's mouse was located for a majority of the rendering time, whether the user scrolled up and down the application prior to and during data entry, and how long the user stayed at the page during data entry.

Further to the above-described example, the analytical program rules applied may be associated with each type of collected user response, such as a rule adjusting the color of a particular window within the application based upon the average position of the Web page in view to the users, or a rule adjusting the type of text or type of questions (fields) based upon the average rendering time of a particular portion of the application in-view to the users. The number of combinations of analytical program rules and associated user response data is extremely high and may be utilized by analytical program 115 and analysis system 170 when performing marketing analysis.

Upon completion of its analysis, analytical program 115 utilizes the collected response data and may apply a number of different rules associated with each response data characteristic, to determine what type of changes, if any, are needed to the content and content rules stored in data store 130 (Step S.630). Accordingly, the content rules and types of content may be altered or added to data store 130.

The analysis performed by analytical program 115 may be performed periodically based upon predetermined conditions set by Web server 110. These conditions may include, but are not limited to, a predetermined clock cycle time and the data store 120 reaching a maximum data threshold.

Upon Web server 110 receiving a subsequent request for the Web page after analytical program 115 completes its analysis of the Web page, analytical program 115 determines whether automatic lift of the rendered content should occur, based upon the analyzed user response data, and information associated with the user located at client node 150 (Step S.640). Middleware program 112 applies the updated rules to the content if it is determined that a lift of the rendered content its needed.

Accordingly, Web server 110 may automatically adjust content rendered on the Web page previously rendered at client nodes 150. A provider controlling the Web server 110 may test the success of certain content or content rules on a customized and dynamic basis. That is, the provider of Web server 110 may program middleware program 112 to adjust the content to test new changes in attributes, or entirely new content, on an automatic basis using the content rules stored in data store 130 and the results of analytical program 115.

Once middleware program 112 analyzes the results of analytical program 115, and applies the rules stored in data store 130 to the content, the Web page is updated and Web server 110 serves the updated page to client nodes 150 requesting the page after analysis and modification of the page have been completed.

For example, consider users located at client nodes 150, viewing the Web page 400 shown in FIG. 4C. Systems, methods and articles of manufacture consistent with the present invention would enable the system to monitor the users' behavior associated with Web page 400, collecting detailed information about the users' activities. In this case, assume a plurality of users viewing Web page 400 shown in FIG. 4C, "clicks-through" on one of the links displayed on the left hand side of Web page 400, under PRODUCTS within ten seconds of Web page being rendered on the users' client node 150. The activities of the users selecting the PRODUCTS link is stored in each respective client side data store 160. Once the users have selected a link on Web page 400, a client side trigger event was initiated (defined for this example), and the collected user information, along with the collected rules and content information, is sent to Web server 110, and subsequently stored in data store 120.

Assume for this example, that the amount of time third version 440 was displayed was a criteria for analysis defined in the analytical program rules executed by analytical program 115. In the above example, the plurality of users monitored did not satisfy predefined conditions for a successful rendering of the third version 440, because as defined in the analytical program rules, within ten seconds the users "clicked-through" to another link and ignored versions 440, 420 and 425 displayed in the center of Web page 300. Accordingly, results reflecting this analysis would be generated by analytical program 115, and in response to the analysis results, analytical program 115 may redefine a content rule stored in data store 130. In this case, data store 130 includes a plurality of sufficient predefined rules and content, and no changes are made to content rules stored data store 130.

Middleware program 112 analyzes the content and content rules applied to Web page 400, and applies the rules to the content based on the results from the analytical program 115. In this case, analytical program 115 determined that a change in version position is the appropriate test to initiate, and middleware program 112 applies a content rule to the content in Web page 400 to adjust the position of versions 440, 420 and 425. The content rules are applied and the position of the content is altered, as shown in FIG. 4G, placing the third version 440 below version 420. Subsequently, when further requests for Web page 400 is received by Web server 400, the adjusted page shown in FIG. 4G is presented in place of the original page shown in FIG. 4C to the client nodes 150 requesting Web page 400.

The dynamic Web-based marketing operations are repeated, with user behavior being monitored at the adjusted Web page shown in FIG. 4G, and the system determines from these new responses whether further adjustments are needed or not. As can be seen, a provider of a Web server may track an enormous amount of marketing information from each user accessing selected Web sites, and gain useful marketing data on the interests and dislikes of potential consumers. This may enable these providers to dynamically adjust their content solicited to the users in order to target them more effectively and to automatically test the effectiveness of the Web pages provided by the Web server.

As a result, the present invention allows providers to perform automatic dynamic market testing. Methods, systems and articles of manufacture consistent with present invention enable users located at client nodes 150, to not only be targeted for advertising, but to also utilize the users' response for evaluating the success of particular rendered content. The dynamic market analysis performed by analysis program 115 enable the server to automatically adjust served content based on responses from users, in a "real-time" and "hands-free" closed loop operation. This type of operation is an advantage over conventional Web-based marketing techniques that require either drastic or time consuming analysis and manual adjustments to rendered content.

Figure 7:
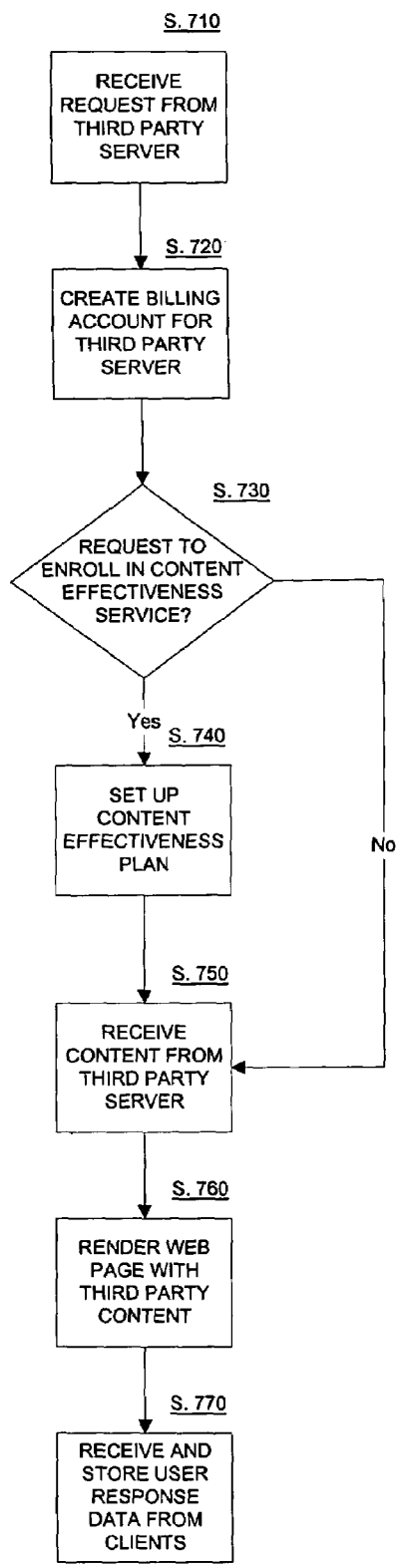
FIG. 7 is an exemplary flow chart of the steps performed by a Web server during third party entity set-up procedures, in accordance with methods and systems consistent with the invention.

In an alternate embodiment of the invention, the detailed user monitoring and collection implementations performed by methods, systems and articles of manufacture consistent with the present invention may be applied to advertisement and content billing management. FIG. 7 is a flow chart of a content marketing process associated with the in-view features performed by Web server 110, in accordance with another aspect of the invention. In accordance with this aspect of the invention, Web server 110 may receive content from third party entities 180 to be included in a rendered Web page by Web server 110. The content received may include content as previously described, including advertisement objects. In one embodiment of the invention, third party entities 180 may provide Web server 110 with an identifier, such as a URL, to be included in a rendered Web page instead of content. In this embodiment, third party entities 180 control the type of content to be included in a rendered Web page, by enabling the URL to link to the third party entity 180 where the content is created and sent to Web server 110.

Third party entities 180 may incorporate Web server 110's services by sending requests to Web server 110 for including third party content into a Web page provided by Web server 110 (Step S.710). In another embodiment, third party entities 180 may contact the provider of Web server 110 in order to incorporate the services provided by Web server 110. Third party entities 180 may communicate with the provider of Web server 110 using any known communications meas available in the art, such as telephonic communications, electronic mail and postal services. In any event, the provider of Web server 110 is made aware of the services desired by third party entities 180 either through network 140, or through some other means, as mentioned above.

Once a request is received, Web server 110 sets-up a billing account for each third party entity 180 that sent a request (Step S.720). A billing account may describe how a third party entity 180 may be charged for particular renderings of third party content within a Web page served by Web server 110. Utilizing the detailed features of the in-view analysis described previously, Web server 110 may diversify its third party content fees based on whether particular content was actually viewable by a user browsing the Web page served by Web server 110. For instance, Web server 110 may charge a third party entity 180 a certain fee only when an in-view analysis of the user response data indicates that the third party entity's content was actually viewable to a user. This fee may be altered based on whether the third party content was fully in-view or partially in-view. For example, consider the Web page 400 illustrated in FIG. 4A. Window 425 is in partial view, while window 420 is in full view. Assume for purposes of this example that windows 420 and 425 are advertisement content provided by a third party entity 180 to be displayed in Web page 300. Web server 110 may charge the third party entity 180 a fee of "$ X" for window 420 being displayed while only charging "$½X" for window 425. Furthermore, Web server 110 may not charge any fee for content or components not at viewable by a user.

Moreover, Web server 110 may provide fee options based on every in-view rendering of a third party content, or a "flat" fee for a certain number of viewable renderings. For example, a third party entity 180 may pay a predetermined fee for 5,000 "viewable" renderings of its provided content on a Web page served by Web server 110. In this case, Web server 110 would keep track of the number of in-view renderings of the provided third party content, and continue to render the provided content until the threshold of 5,000 viewable renderings has been reached. Further to this example, Web server 110 may provide a fee option that charges third party entities 180 additional fees every time a "click-through" occurs on a link included in the third party content.

Accordingly, Web server 110 may provide attractive fee options from which third party entities 180 may chose from, thus ensuring servers 180 are paying for advertisements or content that are actually being seen by users. These fee options may include a plurality of charging options associated with a user's behavior on a Web page and are not limited to the examples described above.

Referring back to FIG. 7, once a billing account has been created for the third party entity 180, an option for enrolling in a content effectiveness service is provided by Web server 110, and billing program 113 (Step S.730). A content effectiveness plan (CEP) allows Web server 110 to provide third party entities proposed information on the effectiveness of the third party content, based on the analysis performed by analytical program 115. That is, Web server 110 may generate a report including proposed statistical information regarding the results of the analytical program 115 directed toward the third party content included in a rendered Web page. For a predetermined fee, third party entities 180 may benefit from the automatic analysis features performed by Web server 110, by receiving detailed reports regarding the activities associated with the content they provided for rendering to Web server 110. For example, Web server 110 may send a third party entity 180, enrolled in the CEP, a report depicting user activity associated with their provided content, and provide suggested changes to the content based on analysis performed by the analytical program 115. Such changes may include changing the color, font, multimedia features, position and any other modifications that may result in increased activity for the rendered content.

Once a third party entity agrees to enroll in a CEP, a plan is set up (Step S.740) by Web server 110. Upon completion of CEP set-up or a third party entity 180 decides not to enroll in a CEP, the third party entity 180 sends content to be rendered to Web server 110, and it is stored in data store 130 (Step S.750). Web server 110 may create billing accounts from a plurality of third party entities, and incorporate content from the plurality of third party entities into a Web page. Web server 110 generates a predetermined Web page, retrieves the third party content stored in data store 130, along with other content it will include in the page, and serves the Web page to the client nodes 150 requesting the page (Step S.760). In another embodiment, as described previously, the content provided by a third party entity 180 may be a URL that links back to the respective third party entity 180, where the desired content is provided to Web server 110. As described previously, client nodes 150 monitor and collect detailed user activity in client side data store 160, including the in-view activities. Upon encountering a client side trigger event, client nodes 150 send the collected user response data to Web server 110 for storage into data store 120 (Step S.770).

Figure 8:
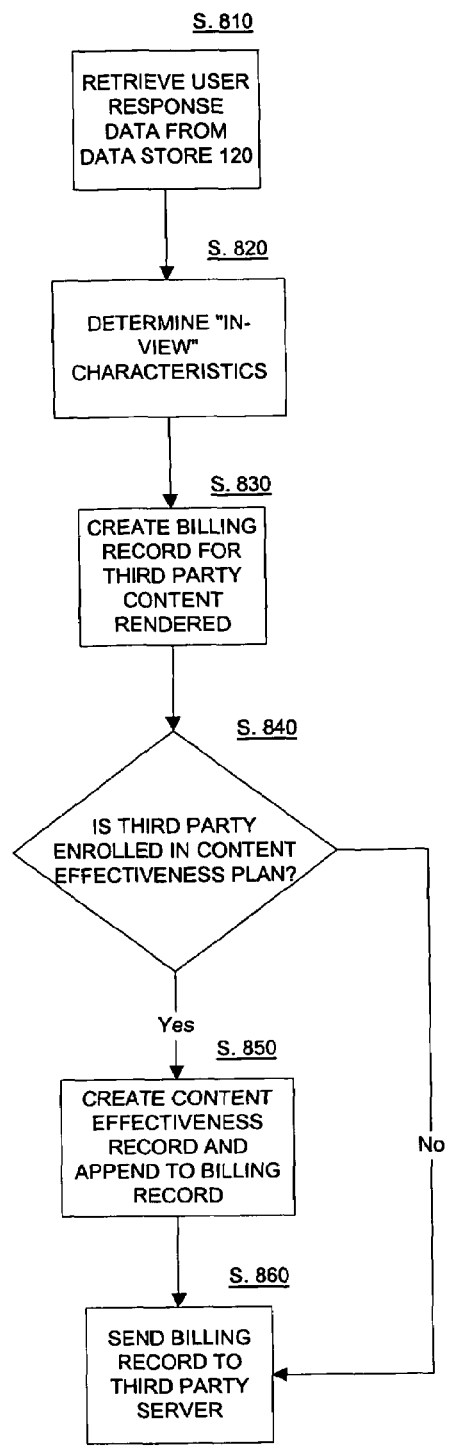
FIG. 8 is an exemplary flow chart of the steps performed by a Web server during a third party in-view analysis and billing operation, in accordance with methods and systems consistent with the invention.

FIG. 8 is a flow chart of a content marketing and billing process associated with the in-view features performed by Web server 110, in accordance with another aspect of the invention. Once Web server 110 has received the collected user responses, analytical program 115 retrieves the collected information for analysis (Step S.810), as described above with reference to FIG. 6. However, in accordance with an aspect of the invention, Web server 110 recognizes when third party content was included in the rendered Web page and in response to this determination performs additional in-view analysis specifically for the third party content. This analysis includes determining the in-view characteristics of each third party content (Step S.820). That is, analytical program 115 may determine the number of times each third party content was in-view or partially in-view on each rendering of the Web page. Utilizing the results of the in-view analysis performed by analytical program 115, billing program 113 generates a billing record associated with each third party entity 180 (Step S.830). The billing record includes billing account information on the types of fees charged to each respective third party entity based on the billing account set up by the third party entity 180.

Once a billing record has been generated, Web server 110 determines whether a third party entity is enrolled in a CEP (Step S.840), and if so a content effectiveness record (CER) is created and appended to the billing record (Step S.850). A content effectiveness record is a record that includes the content effectiveness report described earlier with reference to FIG. 7. Analytical program 115 analyzes the in-view user response data, along with the other user response data collected and stored in data store 120, to generate proposed modifications to the third party content, just as content and content rules are modified with respect to the operations described in FIG. 6. Billing program 113 utilizes the results from this analysis and generates the CER. The CER may also include the collected user event data associated with the third party content. This may be provided in a table or list indicating an aggregated number of user responses associated with predetermined activity fields. For example, in one embodiment, a CER for a third party entity having three versions of a content included in the Web page may include user activity data, as shown in Table 3.

As shown in the example above, a CER may provide each third party entity 180 with information on the effectiveness of several versions of content provided by a third party entity. In Table 3, Version 1 of the content is in a position in the Web page that receives a large proportion of viewable rendering time. Specifically, in this example Version 1 is completely viewable on the average, 78% of the time the Web page is rendered on the users' client nodes, while on the average 84% of the actual content of Version 1 is viewable. Analytical program 115 utilizes the detailed user response data from each client node receiving the Web page, and computes in-view statistics, such as described above, in order to provide the third party entities with useful marketing analysis information. The types of statistical information computed and provided by Web server 110 may vary, and are not limited to the examples described above.

The CER may also include suggestions on changes to the contents based on the information computed by the analytical program 115. Such changes may include changing the color, font, multimedia features, rendering time, position and any other modifications that may result in increased activity for the rendered content. Suggestions within the CER may include eliminating a version of content entirely as well. For example, referring to Table 1, Version 3 may need to change its position based on the statistic of being 100% viewable on the average only 15% of the Web page's rendering time. Accordingly, analytical program 115 may suggest to position the content further up on the Web page to make it more accessible by users. As described, analytical program 115 may generate a plurality of suggestions based on the collected user response data, and are not limited to the examples described above.

On the other hand, if a third party entity 180 is providing the content through an identifier, such as a URL, Web server 110 will not know what type of content is provided. In this case, Web server 110 would provide statistical information regarding the in-view characteristics of the third party entity's content, and enable the entity to utilize the information for determining whether changes are needed in their content.

Returning back to FIG. 8, once the billing record is created, and a CER is included if needed, the billing record is sent to each third party entity 180 for billing (Step S.860). Billing program 113 may send the billing records periodically, wherein the frequency of delivery may be determined by each third party entity, or the billing records may be sent in response to a server side trigger, such as a subsequent request for the Web page including the third party content. The billing record delivery features may include a variety of options and are not limited by the examples listed above. For instance,

TABLE 3

User Response Data Analysis

|  | Number of Web Page renderings | AVG % of Web page rendering time the content is 100% viewable | AVG % of content that is viewable | Total Click-throughs | AVG % of Web page rendering time a mouse pointer is positioned within content |
|---|---|---|---|---|---|
| Content Version 1 | 5,000 | 78% | 84% | 982 | 10% |
| Content Version 2 | 5,000 | 52% | 50% | 755 | 8% |
| Content Version 3 | 5,000 | 15% | 25% | 126 | 26% | billing record or statistical information, may be sent to third party entities without the use of network 140. In this case, any other well known means of communications may be implemented to deliver the reports to the third party entity. That is, the provider of Web server 110 would enable the reports to be created in a medium consistent with a third party entity's needs, and deliver the reports accordingly. For example, if postal services are being implemented, the reports created by Web server 110 would be put in hard copy form and mailed to the appropriate third party entity 180.

In an alternate embodiment of the invention, a third party entity's CEP may arrange for Web server 110 to perform an automatic update to the third party content using the analytical program rules described above with reference to FIG. 6. Thus, Web server 110 would be employed by the third party entity 180 to determine modifications needed for increasing the effectiveness of the third party content, and implement the changes automatically. In this case, the CER would indicate to the third party entity the changes implemented by the Web server, and the results of the changes based on the analysis by the analytical program 112.

As described, methods, systems and articles of manufacture consistent with the present invention enable a Web server the tools to provide Web content provision for third party entities while incorporating a detailed, equitable and attractive billing process that ensure the third party entities are delivered services they pay fees for. In addition to customized content billing, methods, systems and articles of manufacture consistent with the present invention also provide the third party entities proposed effectiveness reports and suggestions for increasing the effectiveness of the third party content rendered by the Web server. Thus, third party entities may utilize the advantages of the analysis performed by methods, systems and articles of manufacture consistent with the present invention to adjust the third party content to better target users.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method for performing dynamic Web-based in-view monitoring, the method comprising:

appending a client side routine to a Web page provided by a Web server, wherein the Web page includes content data;

sending the Web page to a plurality of client nodes; and displaying the Web page to a plurality of users located at respective client nodes, and in response to the Web page being displayed to each user, each client node initiating the client side routine to perform the following:

detecting in-view user activities associated with each respective user browsing the Web page, wherein the in-view user activities are associated with in-view response data reflecting whether or not the content data was viewable or partially viewable to each respective user;

collecting data reflecting the in-view user activities, wherein the collected data includes information indicating the proportion of content actually viewable to a respective user, wherein the collected data is stored in a client side data stored;

detecting a client side trigger event, wherein each client side trigger event is associated with each respective client side data store being filled with the collected data above a predetermined threshold level; and sending the collected data to the Web server in response to the detected client side trigger event; and analyzing the collected data to determine user in-view characteristic data reflecting whether the content was viewable or partially viewable by the respective user.

2. The method of claim 1, wherein the in-view user activities includes at least one of mouse pointer movements, screen scrolling, hyperlink selections, icon selections, data entry, time data associated with mouse pointer position, time data associated with content position and time data associated with screen scrolling.

3. The method of claim 1, wherein the in-view user activities includes non-activated in-view response data reflecting whether the content data was viewable or partially viewable to each respective user, wherein the non-activated in-view response data is user response data that is not associated with a user activating a button, icon or hyperlink on the Web page.

4. The method of claim 1, wherein the client side routine is appended to a URL placed on the Web page.

5. The method of claim 1, further comprising:

analyzing the collected data at the Web server;

generating billing records based on the analysis of the collected data; and sending the billing records to at least one of a plurality of third party nodes.

6. The method of claim 5, wherein the content data includes a plurality of third party content data, and wherein each third party content data is provided by a respective one of the plurality of third party nodes.

7. A method for performing dynamic Web-based in-view monitoring, the method comprising:

appending a client side routine to a Web page provided by a Web server, wherein the Web page includes content data;

sending the Web page to a plurality of client nodes; and displaying the Web page to a plurality of users located at respective client nodes, and in response to the Web page being displayed to each user, each client node initiating the client side routine to perform the following:

detecting in-view user activities associated with each respective user browsing the Web page, wherein the in-view user activities are associated with in-view response data reflecting whether or not the content data was viewable or partially viewable to each respective user;

collecting data reflecting the in-view user activities, wherein the collected data includes information indicating the proportion of content actually viewable to a respective user;

detecting a client side trigger event, wherein each client side trigger event is associated with a respective user closing a browser application executing at a respective client node; and sending the collected data to the Web server in response to the detected client side trigger event; and analyzing the collected data to determine user in-view characteristic data reflecting whether the content was viewable or partially viewable by the respective user.

8. The method of claim 7, wherein the in-view user activities includes at least one of mouse pointer movements, screen scrolling, hyperlink selections, icon selections, data entry, time data associated with mouse pointer position, time data associated with content position and time data associated with screen scrolling.

9. The method of claim 7, wherein the in-view user activities includes non-activated in-view response data reflecting whether the content data was viewable or partially viewable to each respective user, wherein the non-activated in-view response data is user response data that is not associated with a user activating a button, icon or hyperlink on the Web page.

10. The method of claim 7, wherein the client side routine is appended to a URL placed on the Web page.

11. The method of claim 7, further comprising:
analyzing the collected data at the Web server;
generating billing records based on the analysis of the collected data; and
sending the billing records to at least one of a plurality of third party nodes.

12. The method of claim 11, wherein the content data includes a plurality of third party content data, and wherein each third party content data is provided by a respective one of the plurality of third party nodes.

13. A method for performing dynamic Web-based in-view monitoring, the method comprising:
appending a client side routine to a Web page provided by a Web server, wherein the Web page includes content data;
sending the Web page to a plurality of client nodes; and
displaying the Web page to a plurality of users located at respective client nodes, and in response to the Web page being displayed to each user, each client node initiating the client side routine to perform the following:
detecting in-view user activities associated with each respective user browsing the Web page, wherein the in-view user activities are associated with in-view response data reflecting whether or not the content data was viewable or partially viewable to each respective user;
collecting data reflecting the in-view user activities, wherein the collected data includes information indicating the proportion of content actually viewable to a respective user;
detecting a client side trigger event, wherein each client side trigger event is associated with a respective user, located at a respective client node, selecting a URL displayed on the Web page; and
sending the collected data to the Web server in response to the detected client side trigger event; and
analyzing the collected data to determine user in-view characteristic data reflecting whether the content was viewable or partially viewable by the respective user.

14. The method of claim 13, wherein the in-view user activities includes at least one of mouse pointer movements, screen scrolling, hyperlink selections, icon selections, data entry, time data associated with mouse pointer position, time data associated with content position and time data associated with screen scrolling.

15. The method of claim 13, wherein the in-view user activities includes non-activated in-view response data reflecting whether the content data was viewable or partially viewable to each respective user, wherein the non-activated in-view response data is user response data that is not associated with a user activating a button, icon or hyperlink on the Web page.

16. The method of claim 13, wherein the client side routine is appended to a URL placed on the Web page.

17. The method of claim 13, further comprising:
analyzing the collected data at the Web server;
generating billing records based on the analysis of the collected data; and
sending the billing records to at least one of a plurality of third party nodes.

18. The method of claim 17, wherein the content data includes a plurality of third party content data, and wherein each third party content data is provided by a respective one of the plurality of third party nodes.

19. A method for performing dynamic Web-based in-view monitoring, the method comprising:
appending a client side routine to a Web page provided by a Web server, wherein the Web page includes content data;
sending the Web page to a plurality of client nodes; and
displaying the Web page to a plurality of users located at respective client nodes, and in response to the Web page being displayed to each user, each client node initiating the client side routine to perform the following:
detecting in-view user activities associated with each respective user browsing the Web page, wherein the in-view user activities are associated with in-view response data reflecting whether or not the content data was viewable or partially viewable to each respective user, and wherein the in-view user activities are mouse pointer position data;
collecting data reflecting the in-view user activities, wherein the collected data includes information indicating the proportion of content actually viewable to a respective user;
detecting a client side trigger event; and
sending the collected data to the Web server in response to the detected client side trigger event; and
analyzing the collected data to determine user in-view characteristic data reflecting whether the content was viewable or partially viewable by the respective user.

20. The method of claim 19, wherein the in-view user activities includes non-activated in-view response data reflecting whether the content data was viewable or partially viewable to each respective user, wherein the non-activated in-view response data is user response data that is not associated with a user activating a button, icon or hyperlink on the Web page.

21. The method of claim 19, wherein the client side routine is appended to a URL placed on the Web page.

22. The method of claim 19, further comprising:
analyzing the collected data at the Web server;
generating billing records based on the analysis of the collected data; and
sending the billing records to at least one of a plurality of third party nodes.

23. The method of claim 22, wherein the content data includes a plurality of third party content data, and wherein each third party content data is provided by a respective one of the plurality of third party nodes.

24. A system for performing dynamic Web-based analysis, the system comprising:
- means for sending a Web page provided by a Web server to a plurality of client nodes, wherein the Web page includes content data;
- means for displaying the Web page to a plurality of users located at respective client nodes;
- means for detecting in-view user activities associated with each respective user browsing the Web page, wherein the in-view user activities are associated with in-view response data reflecting whether or not the content data was viewable or partially viewable to each respective user;
- means for collecting data reflecting the in-view user activities, wherein the collected data includes information indicating the proportion of content actually viewable to a respective user, wherein the collected data is stored in a client side data store;
- means for detecting a client side trigger event, wherein each client side trigger event is associated with each respective client side data store being filled with the collected data above a predetermined threshold level;
- means for sending the collected data to the Web server in response to the detected client side trigger event; and
- means for analyzing the collected data to determine user in-view characteristic data reflecting whether the content was viewable or partially viewable by the respective user.

25. The system of claim 24, wherein the in-view user activities includes at least one of mouse pointer movements, screen scrolling, hyperlink selections, icon selections, data entry, time data associated with mouse pointer position, time data associated with content position and time data associated with screen scrolling.

26. The system of claim 24, wherein the in-view user activities includes non-activated in-view response data reflecting whether the content data was viewable or partially viewable to each respective user, and wherein the non-activated in-view response data is user response data that is not associated with a user activating a button, icon or hyperlink on the Web page.

27. The system of claim 24, wherein the means for detecting in-view user activities, means for collecting, means for detecting a client side trigger event and means for sending are all included in a client side routine that is appended to a URL placed on the Web page.

28. The system of claim 24, further comprising:
- means for analyzing the collected data;
- means for generating billing records based on the analysis of the collected data; and
- means for sending the billing records to at least one of a plurality of third party nodes.

29. The system of claim 28, wherein the content data includes a plurality of third party content data, and wherein each third party content data is provided by a respective one of the plurality of third party nodes.

30. A system for performing dynamic Web-based analysis, the system comprising:
- means for sending a Web page provided by a Web server to a plurality of client nodes, wherein the Web page includes content data;
- means for displaying the Web page to a plurality of users located at respective client nodes;
- means for detecting in-view user activities associated with each respective user browsing the Web page, wherein the in-view user activities are associated with in-view response data reflecting whether or not the content data was viewable or partially viewable to each respective user;
- means for collecting data reflecting the in-view user activities, wherein the collected data includes information indicating the proportion of content actually viewable to a respective user;
- means for detecting a client side trigger event, wherein each client side trigger event is associated with a respective user closing a browser application executing at a respective client node;
- means for sending the collected data to the Web server in response to the detected client side trigger event; and
- means for analyzing the collected data to determine user in-view characteristic data reflecting whether the content was viewable or partially viewable by the respective user.

31. The system of claim 30, wherein the in-view user activities includes at least one of mouse pointer movements, screen scrolling, hyperlink selections, icon selections, data entry, time data associated with mouse pointer position, time data associated with content position and time data associated with screen scrolling.

32. The system of claim 30, wherein the in-view user activities includes non-activated in-view response data reflecting whether the content data was viewable or partially viewable to each respective user, and wherein the non-activated in-view response data is user response data that is not associated with a user activating a button, icon or hyperlink on the Web page.

33. The system of claim 30, wherein the means for detecting in-view user activities, means for collecting, means for detecting a client side trigger event and means for sending are all included in a client side routine that is appended to a URL placed on the Web page.

34. The system of claim 30, further comprising:
- means for analyzing the collected data;
- means for generating billing records based on the analysis of the collected data; and
- means for sending the billing records to at least one of a plurality of third party nodes.

35. The system of claim 34, wherein the content data includes a plurality of third party content data, and wherein each third party content data is provided by a respective one of the plurality of third party nodes.

36. A system for performing dynamic Web-based analysis, the system comprising:
- means for sending a Web page provided by a Web server to a plurality of client nodes, wherein the Web page includes content data;
- means for displaying the Web page to a plurality of users located at respective client nodes;
- means for detecting in-view user activities associated with each respective user browsing the Web page, wherein the in-view user activities are associated with in-view response data reflecting whether or not the content data was viewable or partially viewable to each respective user;
- means for collecting data reflecting the in-view user activities, wherein the collected data includes information indicating the proportion of content actually viewable to a respective user;
- means for detecting a client side trigger event, wherein each client side trigger event is associated with a respective user, located at a respective client node, selecting a URL displayed on the Web page;

means for sending the collected data to the Web server in response to the detected client side trigger event; and means for analyzing the collected data to determine user in-view characteristic data reflecting whether the content was viewable or partially viewable by the respective user.

37. The system of claim 36, wherein the in-view user activities includes at least one of mouse pointer movements, screen scrolling, hyperlink selections, icon selections, data entry, time data associated with mouse pointer position, time data associated with content position and time data associated with screen scrolling.

38. The system of claim 36, wherein the in-view user activities includes non-activated in-view response data reflecting whether the content data was viewable or partially viewable to each respective user, and wherein the non-activated in-view response data is user response data that is not associated with a user activating a button, icon or hyperlink on the Web page.

39. The system of claim 36, wherein the means for detecting in-view user activities, means for collecting, means for detecting a client side trigger event and means for sending are all included in a client side routine that is appended to a URL placed on the Web page.

40. The system of claim 36, further comprising:
means for analyzing the collected data;
means for generating billing records based on the analysis of the collected data; and
means for sending the billing records to at least one of a plurality of third party nodes.

41. The system of claim 40, wherein the content data includes a plurality of third party content data, and wherein each third party content data is provided by a respective one of the plurality of third party nodes.

42. A system for performing dynamic Web-based analysis, the system comprising:
means for sending a Web page provided by a Web server to a plurality of client nodes, wherein the Web page includes content data;
means for displaying the Web page to a plurality of users located at respective client nodes;
means for detecting in-view user activities associated with each respective user browsing the Web page, wherein the in-view user activities are associated with in-view response data reflecting whether or not the content data was viewable or partially viewable to each respective user and wherein the in-view user activities are mouse pointer position data;
means for collecting data reflecting the in-view user activities, wherein the collected data includes information indicating the proportion of content actually viewable to a respective user;
means for detecting a client side trigger event;
means for sending the collected data to the Web server in response to the detected client side trigger event; and
means for analyzing the collected data to determine user in-view characteristic data reflecting whether the content was viewable or partially viewable by the respective user.

43. The system of claim 42, wherein the in-view user activities includes non-activated in-view response data reflecting whether the content data was viewable or partially viewable to each respective user, and wherein the non-activated in-view response data is user response data that is not associated with a user activating a button, icon or hyperlink on the Web page.

44. The system of claim 42, wherein the means for detecting in-view user activities, means for collecting, means for detecting a client side trigger event and means for sending are all included in a client side routine that is appended to a URL placed on the Web page.

45. The system of claim 42, further comprising:
means for analyzing the collected data;
means for generating billing records based on the analysis of the collected data; and
means for sending the billing records to at least one of a plurality of third party nodes.

46. The system of claim 45, wherein the content data includes a plurality of third party content data, and wherein each third party content data is provided by a respective one of the plurality of third party nodes.

47. A computer-readable medium for performing dynamic Web-based in-view monitoring, the method comprising:
appending a client side routine to a Web page provided by a Web server, wherein the Web page includes content data;
sending the Web page to a plurality of client nodes; and
displaying the Web page to a plurality of users located at respective client nodes, and in response to the Web page being displayed to each user, each client node initiating the client side routine to perform the following:
detecting in-view user activities associated with each respective user browsing the Web page, wherein the in-view user activities are associated with in-view response data reflecting whether or not the content data was viewable to each respective user;
collecting data reflecting the in-view user activities, wherein the collected data includes information indicating the proportion of content actually viewable to a respective user, wherein the collected data is stored in a client side data stored;
detecting a client side trigger event, wherein each client side trigger event is associated with each respective client side data store being filled with the collected data above a predetermined threshold level; and
sending the collected data to the Web server in response to the detected client side trigger event; and
analyzing the collected data to determine user in-view characteristic data reflecting whether the content was viewable or partially viewable by the respective user.

48. The computer-readable medium of claim 47, wherein the in-view user activities includes at least one of mouse pointer movements, screen scrolling, hyperlink selections, icon selections, data entry, time data associated with mouse pointer position, time data associated with content position and time data associated with screen scrolling.

49. The computer-readable medium of claim 47, wherein the in-view user activities includes non-activated in-view response data reflecting whether the content data was viewable or partially viewable to each respective user, wherein the non-activated in-view response data is user response data that is not associated with a user activating a button, icon or hyperlink on the Web page.

50. The computer-readable medium of claim 47, wherein the client side routine is appended to a URL placed on the Web page.

51. The computer-readable medium of claim 47, further comprising:
analyzing the collected data at the Web server;
generating billing records based on the analysis of the collected data; and
sending the billing records to at least one of a plurality of third party nodes.

52. The computer-readable medium of claim 51, wherein the content data includes a plurality of third party content data, and wherein each third party content data is provided by a respective one of the plurality of third party nodes.

53. A computer-readable medium for performing dynamic Web-based in-view monitoring, the method comprising:
appending a client side routine to a Web page provided by a Web server, wherein the Web page includes content data;
sending the Web page to a plurality of client nodes; and
displaying the Web page to a plurality of users located at respective client nodes, and in response to the Web page being displayed to each user, each client node initiating the client side routine to perform the following:
detecting in-view user activities associated with each respective user browsing the Web page, wherein the in-view user activities are associated with in-view response data reflecting whether or not the content data was viewable to each respective user;
collecting data reflecting the in-view user activities, wherein the collected data includes information indicating the proportion of content actually viewable to a respective user;
detecting a client side trigger event, wherein each client side trigger event is associated with a respective user closing a browser application executing at a respective client node; and
sending the collected data to the Web server in response to the detected client side trigger event; and
analyzing the collected data to determine user in-view characteristic data reflecting whether the content was viewable or partially viewable by the respective user.

54. The computer-readable medium of claim 53, wherein the in-view user activities includes at least one of mouse pointer movements, screen scrolling, hyperlink selections, icon selections, data entry, time data associated with mouse pointer position, time data associated with content position and time data associated with screen scrolling.

55. The computer-readable medium of claim 53, wherein the in-view user activities includes non-activated in-view response data reflecting whether the content data was viewable or partially viewable to each respective user, wherein the non-activated in-view response data is user response data that is not associated with a user activating a button, icon or hyperlink on the Web page.

56. The computer-readable medium of claim 53, wherein the client side routine is appended to a URL placed on the Web page.

57. The computer-readable medium of claim 53, further comprising:
analyzing the collected data at the Web server;
generating billing records based on the analysis of the collected data; and
sending the billing records to at least one of a plurality of third party nodes.

58. The computer-readable medium of claim 57, wherein the content data includes a plurality of third party content data, and wherein each third party content data is provided by a respective one of the plurality of third party nodes.

59. A computer-readable medium for performing dynamic Web-based in-view monitoring, the method comprising:
appending a client side routine to a Web page provided by a Web server, wherein the Web page includes content data;
sending the Web page to a plurality of client nodes; and
displaying the Web page to a plurality of users located at respective client nodes, and in response to the Web page being displayed to each user, each client node initiating the client side routine to perform the following:
detecting in-view user activities associated with each respective user browsing the Web page, wherein the in-view user activities are associated with in-view response data reflecting whether or not the content data was viewable to each respective user;
collecting data reflecting the in-view user activities, wherein the collected data includes information indicating the proportion of content actually viewable to a respective user;
detecting a client side trigger event, wherein each client side trigger event is associated with a respective user, located at a respective client node, selecting a URL displayed on the Web page; and
sending the collected data to the Web server in response to the detected client side trigger event; and
analyzing the collected data to determine user in-view characteristic data reflecting whether the content was viewable or partially viewable by the respective user.

60. The computer-readable medium of claim 59, wherein the in-view user activities includes at least one of mouse pointer movements, screen scrolling, hyperlink selections, icon selections, data entry, time data associated with mouse pointer position, time data associated with content position and time data associated with screen scrolling.

61. The computer-readable medium of claim 59, wherein the in-view user activities includes non-activated in-view response data reflecting whether the content data was viewable or partially viewable to each respective user, wherein the non-activated in-view response data is user response data that is not associated with a user activating a button, icon or hyperlink on the Web page.

62. The computer-readable medium of claim 59, wherein the client side routine is appended to a URL placed on the Web page.

63. The computer-readable medium of claim 59, further comprising:
analyzing the collected data at the Web server;
generating billing records based on the analysis of the collected data; and
sending the billing records to at least one of a plurality of third party nodes.

64. The computer-readable medium of claim 63, wherein the content data includes a plurality of third party content data, and wherein each third party content data is provided by a respective one of the plurality of third party nodes.

65. A computer-readable medium for performing dynamic Web-based in-view monitoring, the method comprising:
appending a client side routine to a Web page provided by a Web server, wherein the Web page includes content data;
sending the Web page to a plurality of client nodes; and
displaying the Web page to a plurality of users located at respective client nodes, and in response to the Web page being displayed to each user, each client node initiating the client side routine to perform the following:
detecting in-view user activities associated with each respective user browsing the Web page, wherein the in-view user activities are associated with in-view response data reflecting whether or not the content data was viewable to each respective user and, wherein the in-view user activities are mouse pointer position data;

collecting data reflecting the in-view user activities, wherein the collected data includes information indicating the proportion of content actually viewable to a respective user;

detecting a client side trigger event; and sending the collected data to the Web server in response to the detected client side trigger event; and analyzing the collected data to determine user in-view characteristic data reflecting whether the content was viewable or partially viewable by the respective user.

66. The computer-readable medium of claim 65, wherein the in-view user activities includes non-activated in-view response data reflecting whether the content data was viewable or partially viewable to each respective user, wherein the non-activated in-view response data is user response data that is not associated with a user activating a button, icon or hyperlink on the Web page.

67. The computer-readable medium of claim 65, wherein the client side routine is appended to a URL placed on the Web page.

68. The computer-readable medium of claim 65, further comprising:

analyzing the collected data at the Web server;

generating billing records based on the analysis of the collected data; and sending the billing records to at least one of a plurality of third party nodes.

69. The computer-readable medium of claim 68, wherein the content data includes a plurality of third party content data, and wherein each third party content data is provided by a respective one of the plurality of third party nodes.

* * * * *